US008144869B2

(12) United States Patent
Nakano et al.

(10) Patent No.: US 8,144,869 B2
(45) Date of Patent: Mar. 27, 2012

(54) CONTENT PROTECTION SYSTEM, KEY DATA GENERATION APPARATUS, AND TERMINAL APPARATUS

(75) Inventors: Toshihisa Nakano, Neyagawa (JP); Motoji Ohmori, Hirakata (JP); Natsume Matsuzaki, Mino (JP); Makoto Tatebayashi, Takarazuka (JP); Naoki Yamamoto, Neyagawa (JP); Hideshi Ishihara, Katano (JP)

(73) Assignee: Panasonic Corporation, Osaka (JP)

( * ) Notice: Subject to any disclaimer, the term of this patent is extended or adjusted under 35 U.S.C. 154(b) by 826 days.

(21) Appl. No.: 12/112,670

(22) Filed: Apr. 30, 2008

(65) Prior Publication Data
US 2008/0205652 A1    Aug. 28, 2008

Related U.S. Application Data

(63) Continuation of application No. 10/755,327, filed on Jan. 13, 2004, now Pat. No. 7,386,126.

(30) Foreign Application Priority Data

Jan. 15, 2003  (JP) ................................ 2003-007349
Apr. 4, 2003   (JP) ................................ 2003-101455

(51) Int. Cl.
*H04N 7/167* (2011.01)
(52) U.S. Cl. ............. 380/201; 380/277; 380/45; 726/26
(58) Field of Classification Search .................. 380/201, 380/277, 45; 726/26
See application file for complete search history.

(56) References Cited

U.S. PATENT DOCUMENTS 6,141,685 A * 10/2000 Iwamoto ....................... 709/224

| 6,240,188 | B1 * | 5/2001 | Dondeti et al. | 380/284 |
| 6,301,660 | B1 | 10/2001 | Benson | |
| 6,347,846 | B1 * | 2/2002 | Nakamura | 380/203 |
| 6,397,329 | B1 * | 5/2002 | Aiello et al. | 713/155 |
| 6,438,235 | B2 * | 8/2002 | Sims, III | 380/285 |
| 6,477,649 | B2 * | 11/2002 | Kambayashi et al. | 726/27 |
| 6,832,319 | B1 * | 12/2004 | Bell et al. | 713/193 |

(Continued)

FOREIGN PATENT DOCUMENTS

EP    1 176 754    1/2002

(Continued)

OTHER PUBLICATIONS

International Search Report issued Jun. 9, 2004 in International Application No. PCT/JP2004/000155.

(Continued)

*Primary Examiner* — Edan Orgad
*Assistant Examiner* — James Turchen
(74) *Attorney, Agent, or Firm* — Wenderoth, Lind & Ponack, L.L.P.

(57) ABSTRACT

A content protection system prevents illegal key acquisition, without checking uniqueness of device keys. The content protection system includes a key data generation apparatus and a user terminal. The key data generation apparatus converts first key data, which is for using content, based on a predetermined conversion rule, thereby generating second key data, encrypts the second key data using a device key held by valid terminals, and outputs the encrypted key data. The user terminal obtains the encrypted key data, decrypts the encrypted key data using a device key held by the user terminal, thereby generating second key data, converts the second key data based on a re-conversion rule corresponding to the conversion rule, thereby generating the first key data, and uses the content with use of the generated first key data.

4 Claims, 12 Drawing Sheets

U.S. PATENT DOCUMENTS

| | | | |
|---|---|---|---|
| 6,880,081 B1* | 4/2005 | Itkis | 713/163 |
| 6,883,097 B1* | 4/2005 | Lotspiech et al. | 713/193 |
| 6,911,974 B2* | 6/2005 | Asano et al. | 345/204 |
| 7,010,125 B2* | 3/2006 | Lotspiech et al. | 380/242 |
| 7,013,010 B2* | 3/2006 | Ripley | 380/201 |
| 7,017,100 B2* | 3/2006 | Kojima et al. | 714/755 |
| 7,039,803 B2* | 5/2006 | Lotspiech et al. | 713/163 |
| 7,088,822 B2* | 8/2006 | Asano | 380/45 |
| 7,092,527 B2* | 8/2006 | Foster et al. | 380/277 |
| 7,131,010 B2* | 10/2006 | Okaue et al. | 713/189 |
| 7,152,166 B2* | 12/2006 | Strom et al. | 713/193 |
| 2002/0015494 A1* | 2/2002 | Nagai et al. | 380/201 |
| 2002/0016919 A1* | 2/2002 | Sims, III | 713/193 |
| 2002/0076204 A1* | 6/2002 | Nakano et al. | 386/94 |
| 2002/0104001 A1* | 8/2002 | Lotspiech et al. | 713/163 |
| 2002/0108055 A1* | 8/2002 | Okaue | 713/200 |
| 2002/0123968 A1* | 9/2002 | Okayama et al. | 705/57 |
| 2002/0152387 A1* | 10/2002 | Asano | 713/176 |
| 2003/0051151 A1* | 3/2003 | Asano et al. | 713/193 |
| 2003/0081792 A1* | 5/2003 | Nakano et al. | 380/286 |
| 2003/0142824 A1* | 7/2003 | Asano et al. | 380/277 |
| 2004/0030909 A1* | 2/2004 | Sako et al. | 713/193 |

FOREIGN PATENT DOCUMENTS

| | | |
|---|---|---|
| JP | 7-28407 | 1/1995 |
| JP | 2002-281013 | 9/2002 |
| JP | 2003-169048 | 6/2003 |
| RU | 2 067 313 C1 | 9/1996 |
| RU | 2 073 913 C1 | 2/1997 |
| RU | 2 154 856 C1 | 8/2000 |
| WO | 92/05556 | 4/1992 |
| WO | 01/52234 | 7/2001 |
| WO | 02/44875 | 6/2002 |
| WO | 02/060116 A2 | 8/2002 |
| WO | 02/060116 A3 | 8/2002 |
| WO | 02/078419 | 10/2002 |

OTHER PUBLICATIONS

Written Opinion of the International Searching Authority issued Jun. 9, 2004 in International Application No. PCT/JP2004/000155.

S. M. Ghanem et al., "A Simple XOR-based Technique for Distributing Group Key in Secure Multicasting", Proceedings ISCC 2000, Fifth IEEE Symposium on Computers and Communications, Proceedings of 5$^{th}$ IEEE Symposium on Computer and Communications, Antibes-Juan Les Pins, France, Jul. 3-6, 2000, pp. 166-171.

D. W. Davies and W. L. Price, "Security for Computer Networks: An Introduction to Data Security in Teleprocessing and Electronic Funds Transfer", chapter 4:4-1-4-3, Dec. 5, 1985.

Dalit Naor et al., "Revocation and Tracing Schemes for Stateless Receivers", Advances in Crytology Crypto 2001 21$^{st}$ Annual International Cryptology Conferences, Aug. 19, 2001, pp. 1-34, XP002203174, Santa Barbara, CA, USA.

* cited by examiner

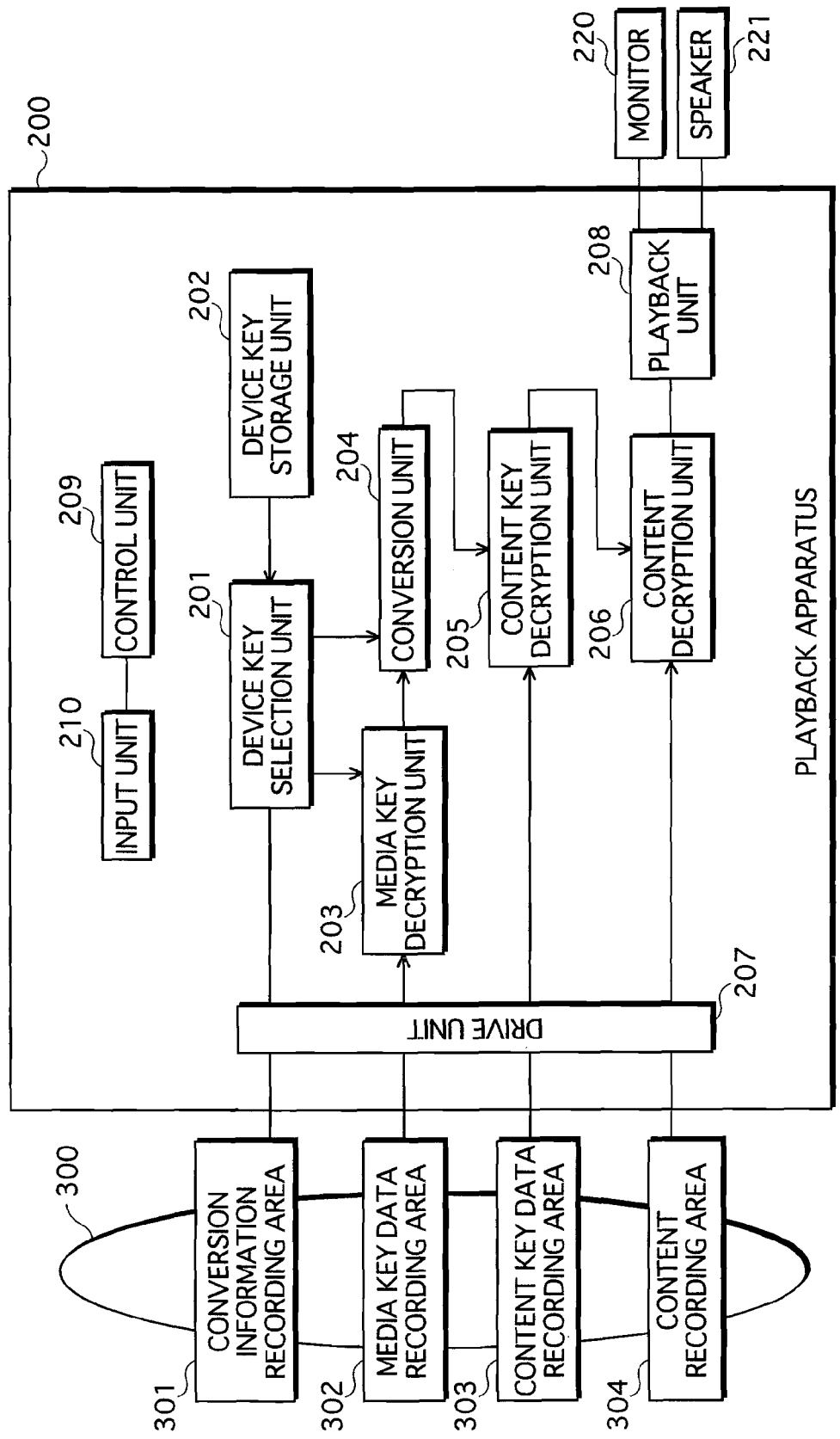

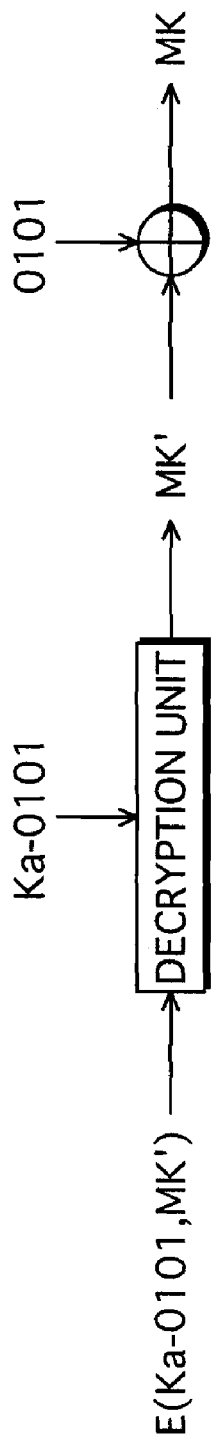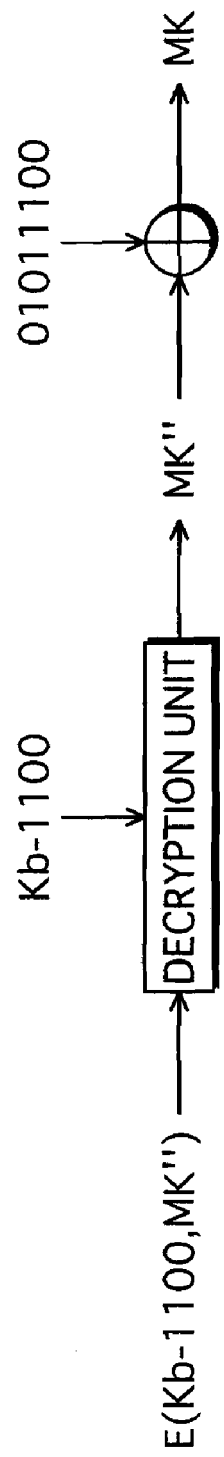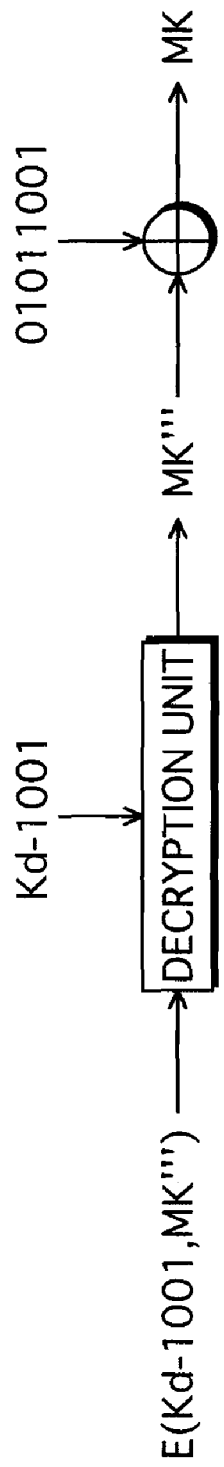

FIG.11
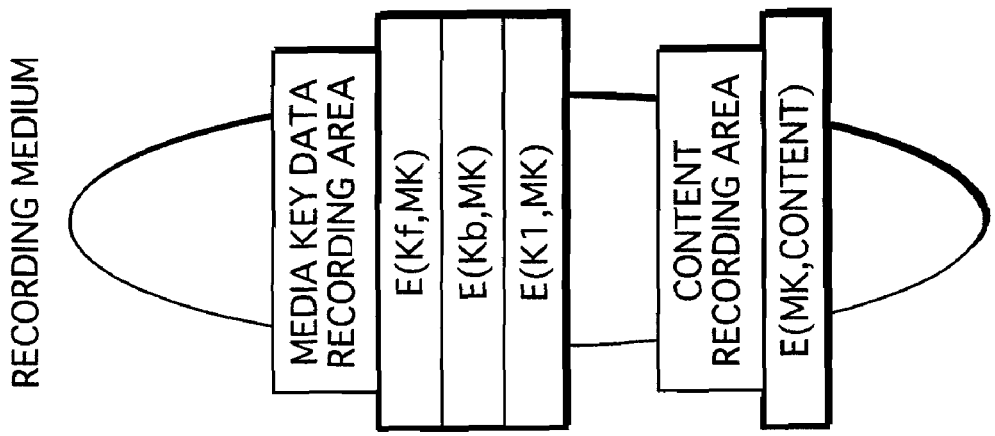
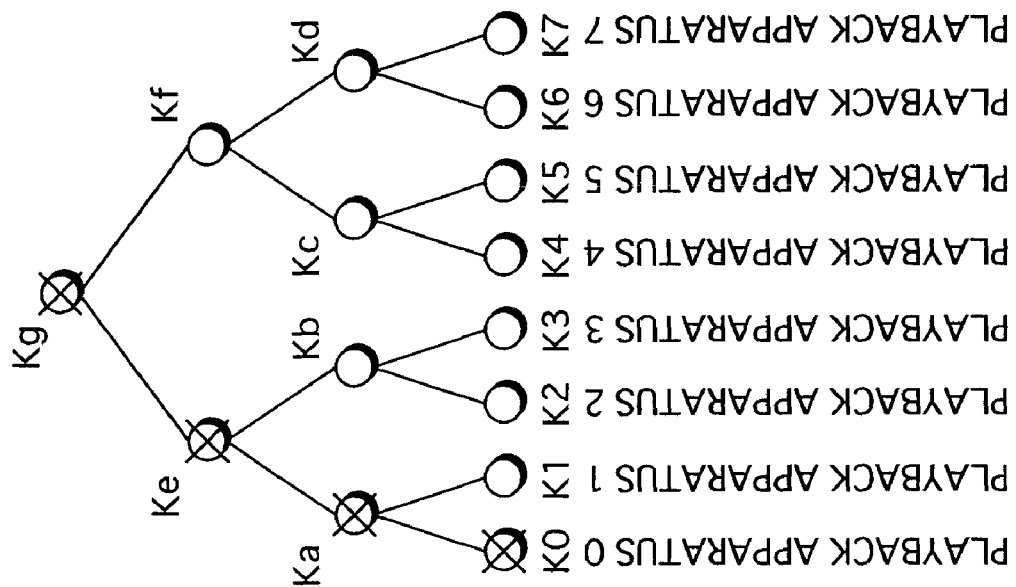

US 8,144,869 B2

CONTENT PROTECTION SYSTEM, KEY DATA GENERATION APPARATUS, AND TERMINAL APPARATUS

This is a continuation of U.S. patent application Ser. No. 10/755,327, filed Jan. 13, 2004 now U.S. Pat. No. 7,386,126.

BACKGROUND OF THE INVENTION (1) Field of the Invention

The present invention relates to a system for recording digitized data of content that is a work such as a movie to a large-capacity recording medium such as an optical disc, and playing back the content.

(2) Description of the Related Art

In order to protect the copyright of content that is a work such as a movie or music, playback apparatuses are given a plurality of device keys, and the content is recorded in an encrypted state on a recording medium, together with key data that is used for decrypting the content and that can be obtained only by a playback apparatus that is permitted to play back the content. One way of managing keys for generating this kind of key data is to use a tree structure.

Document 1 discloses a technique relating to a key management system that uses a tree structure, and in which the amount of key information is relatively small and individual keys are able to be revoked. Furthermore, Document 2 discloses a technique that is based on the technique in Document 1 and that relates to a digital content protection key management method that suppresses increases in the number of device keys held in advance by the playback apparatuses while reducing the amount of the key information recorded on the recording medium.

The following outlines the key management method disclosed in Document 1.

A key management organization manages device keys such that the leaves in a tree structure are in one-to-one correspondence with playback apparatuses. Each playback apparatus holds device keys corresponded with nodes positioned on the route from the root through to the leaf corresponding to the playback device. The key management organization encrypts one content and a media key MK used to decrypt the content, using a device key K which is the device key among all of the managed device keys that is shared by the greatest number of playback apparatuses. Then, the key management organization writes the encrypted media key E (K, MK) to a recording medium. Note that E(X, Y) denotes a ciphertext obtained by encrypting data Y with key data X.

Here, if a playback apparatus is internally analyzed and all the device keys held by the playback apparatus are exposed, the key management organization revokes the exposed keys, and selects, from among the remaining device keys, device keys that are shared by the greatest numbers of playback apparatus, and uses the selected device keys to encrypt the media key MK.

As shown in FIG. 11, in the case of a playback apparatus 0 being revoked, device keys Kf, Kb, and K1 are used to encrypt the media key MK, thereby generating ciphertexts E(Kf, MK), E(Kb, MK), and E(K1, MK), which are written to the recording medium.

Accordingly, the revoked playback device 0 is unable to obtain the media key MK since it does not have any of the device keys Kf, Kb, and K1, and only playback devices having any of the device keys Kf, Kb and K1 are able to obtain the media key MK.

Here, if the uniqueness of the device keys is lost, for example if respective values of the device key Kf and the device key k1 are the identical, the values of the ciphertexts E(Kf, MK) and E (K1, MK) recorded on the recording medium will be the same. This means that it will be publicly-known that the device keys Kf and K1 have the identical values.

If the playback apparatus 7 is later revoked, as shown in FIG. 12, the key management organization encrypts the media key MK with use of the device keys Kb, Kc, K1 and K6, and four ciphertexts E(Kb, MK), E(Kc, MK), E(K1, MK), and E(K6, MK) are recorded on the recording medium.

Here, since the device key Kf held by the playback apparatus 7 has already been exposed and because of the fact that it is publicly known that Kf and K1 are identical, there is a danger that an illegal party will use the exposed Kf to decrypt the ciphertext E(K1, MK) and thereby illegally obtain the media key MK. If in order to prevent such illegal acts the ciphertext E (K1, MK) is not recorded to the recording medium, a problem arises that the valid playback apparatus 1 becomes unable to obtain the media key MK and is revoked unjustly.

One example of a way of preventing the media key from being obtained illegally and a playback apparatus that should not be revoked from being revoked unjustly is to ensure (guarantee) the uniqueness of each device key. Specifically, since device keys are usually generated using a random number generator that generates a random number series, one method is to check, each time a device key is generated, whether or not the device key matches any previously-generated device keys. Here, the random number series is destroyed if a matching device key exists, and used if a matching device key does not exist.

However, in a large-scale system in which the number of playback apparatuses is in the billions, it is enormously costly in terms of time to check whether or not each generated device key matches previously-generated device keys. Even when the key management method in Document 2 is used, the same problem of the time taken to check the device keys arises.

Document 1

Nakano, Ohmori and Tatebayashi "*Digital Content Hogoyou Kagi Kanri Houshiki (Key Management System for Digital Content Protection)*", The 2001 Symposium on Cryptography and Information Security, SCIS2001, 5A-5, January 2001.

Document 2

Nakano, Ohmori and Tatebayashi "*Digital Content Hogoyou Kanri Houshiki—Ki-kouzou Pattern Bunkatsu Houshiki (Key Management System for Digital Content Protection—Tree Pattern Division Method)*", The 2002 Symposium on Cryptography and Information Security, SCIS2002, 10C-1, January 2002.

SUMMARY OF THE INVENTION

In view of the stated problems, the object of the present invention is to provide a content protection system which prevents illegal acquisition of a media key and unjust revocation of a playback device that should not be revoked, without checking the uniqueness of device keys.

In order to achieve the stated object, the present invention is a content protection system in which content is usable only by a valid terminal apparatus, including: a key data generation apparatus that includes: a conversion unit operable to convert, based on a predetermined conversion rule, first key data for use in using the content, thereby generating second key data; an encryption unit operable to encrypt the second key data using a device key held by the valid terminal apparatus, thereby generating encrypted key data; and an output unit operable to output the encrypted key data, and a terminal apparatus that includes: an obtaining unit operable to obtain the encrypted key data; a decryption unit operable to decrypt the encrypted key data using a device key held by the terminal apparatus, thereby generating second key data; a conversion unit operable to convert, based on a predetermined conversion rule, the second key data, thereby obtaining first key data; and a content usage unit operable to use the content, based on the first key data.

According to the stated structure, even if the device keys have identical values, the encrypted key data will not necessarily have identical values. Furthermore, it is not possible to determine whether or not the device keys have identical values using the encrypted key data. Therefore, illegal acquisition of the first key data can be prevented. Accordingly, revocation of playback devices that should not be revoked is prevented.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 6 is a block diagram showing the structure of the DVD 300 and a playback apparatus 200;

FIG. 7 shows the contents of encrypted media key decryption and re-conversion processing;

FIG. 11 shows an example of a key management method that uses a tree structure.

DESCRIPTION OF THE PREFERRED EMBODIMENT

The following describes embodiments of the present invention with reference to the drawings.

First Embodiment

1. Structure of the Copyright Protection System

Figure 1:
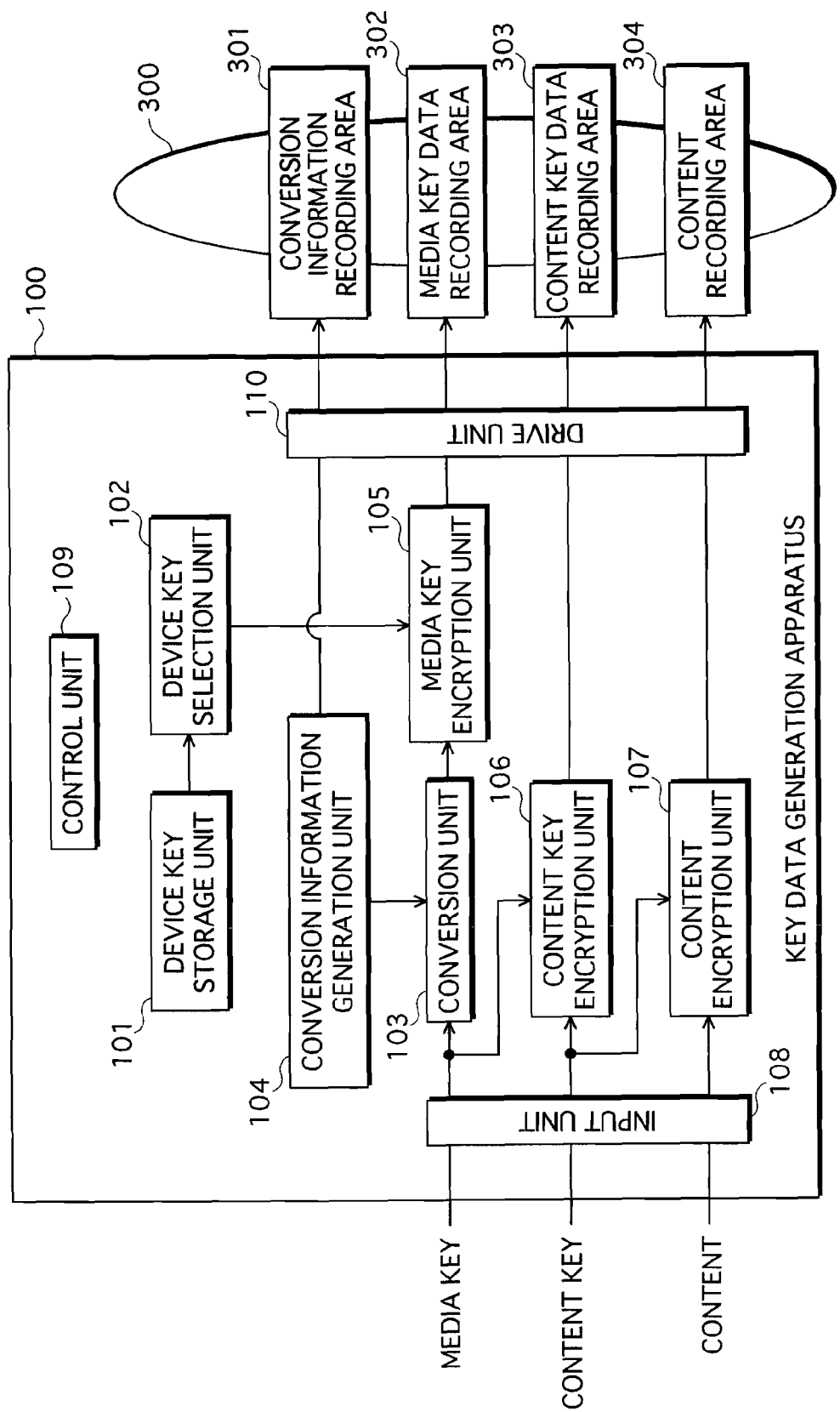
FIG. 1 is a block diagram showing the structure of a key data generation apparatus 100 and a recording medium 300.

The copyright protection system, as shown in FIGS. 1 and 6, is composed of a key data generation apparatus 100, a plurality of playback apparatuses 200a, 200b, etc., and a DVD 300. Note that the common structure of the playback apparatuses 200a, 200b, etc. is shown as a playback apparatus 200 in FIG. 6.

The key data generation apparatus 100, which is held by a key management organization, records content and key data for playing back the content to the DVD 300. The key data is selected so that only valid playback apparatuses are able to play back the content, and is managed with a tree structure.

The playback apparatuses 200a, 200b, etc., which are held by respective users, are each assigned a plurality of device keys in advance by the key data generation apparatus 100. Furthermore, each of the playback apparatuses 200a, 200b, etc. selects an appropriate device key from amongst the allocated device keys, and uses the selected device key to decrypt and play back the encrypted content recorded on the DVD 300.

The following describes each structure.

1.1 Key Data Generation Apparatus 100

The key data generation apparatus 100, as shown in FIG. 1, is composed of a device key storage unit 101, a device key selection unit 102, a conversion unit 103, a conversion information generation unit 104, a media key encryption unit 105, a content key encryption unit 106, a content encryption unit 107, an input unit 108, a control unit 109, and a drive unit 110.

Specifically, the key data generation apparatus 100 is computer system composed of a microprocessor, a ROM, a RAM, a hard disk unit, a display unit, a keyboard, a mouse, and the like. A computer program is stored in the RAM or the hard disk unit, and the key data generation apparatus 100 achieves its functions by the microprocessor operating according to the computer program.

(1) Input Unit 108 and Drive Unit 110

The input unit 108 receives inputs of a media key MK, a content key CK, and content, from an external source, and outputs the media key MK to the conversion unit 103 and the content key encryption unit 106, the content key CK to the content key encryption unit 106 and the content encryption unit 107, and the content to the content encryption unit 107.

Note that the media key may be information unique to the DVD 300, or may be key data generated from information unique to the DVD 300.

The drive unit 110 writes the conversion information, the encrypted key data, and the encrypted content to the DVD 300, under the control of the control unit 109.

(2) Control Unit 109

The control unit 109 controls the device key selection unit 102 so as to have it select at least one device key, from among the managed device keys, commonly held by the greatest number of playback apparatuses.

Furthermore, the control unit 109 controls the conversion information generation unit 104 so as to have it generate conversion information for each of the selected device key or keys.

Next, the control unit 109 controls the conversion unit 103 so as to have it convert the media key MK respectively using each piece of conversion information generated by the conversion information generation unit 104.

Furthermore, the control unit 109 controls the media key encryption unit 105 so as to have it encrypt the converted media keys MK using each of the respective selective device keys. The control unit 109 also controls the content key encryption unit 106 so as to have it encrypt the received content key using the media key, and controls the content encryption unit 107 so as to have it encrypt the content.

The control unit 109 has the respective encrypted key data, conversion information and encrypted content written to the DVD 300 via the drive unit 110.

(3) Device Key Storage Unit 101

The device key storage unit 101 stores all device keys given to the playback apparatuses belonging to the copyright protection system.

Figure 2:
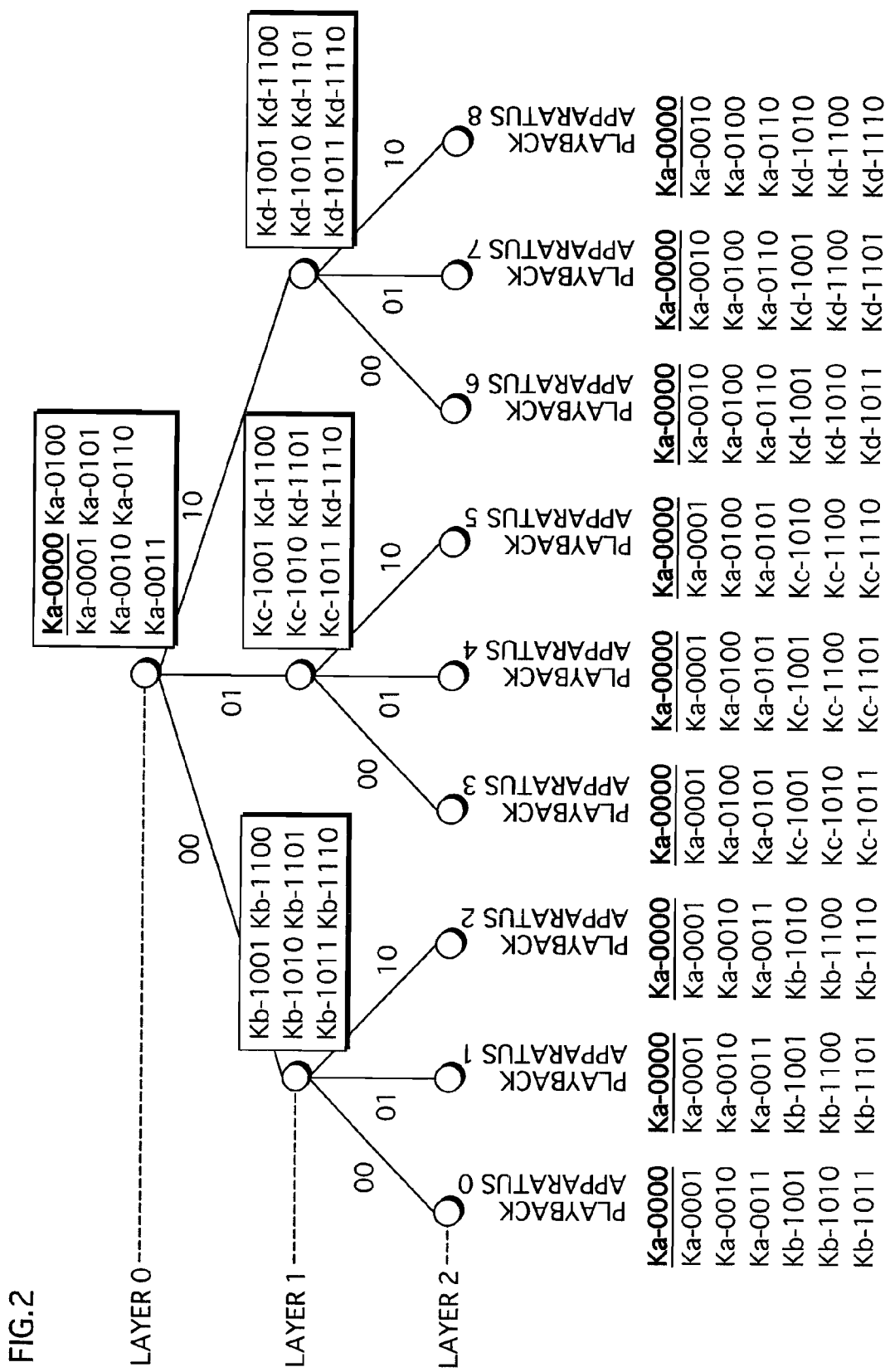
FIG. 2 shows a tree structure expressing the correlation between device keys, in the key data generation apparatus 100.

The device keys stored by the device key storage unit 101 are generated and assigned to the playback apparatuses using the tree structure key management method shown in FIG. 2.

Note that although the tree structure is described as being a 3-ary tree with three layers in the present embodiment, the tree structure is not limited to being a 3-ary tree, and may have even more layers. The tree structure management method is described in detail in Document 2.

The following briefly describes the tree structure.

The tree structure is composed of nodes and paths. Each "joint" in the tree is called a node, and the nodes are connected by paths. Each level on which nodes are positioned in the tree structure is called a layer. A node that is above a particular node and connected to that node by one path is called a parent node, and the nodes that are below a parent node and connected to the parent node by paths are called child nodes.

Furthermore, the node on the highest layer is called a root, and the nodes on the lowest layer are called leaves. The playback apparatuses are assigned one-to-one to the leaves. In FIG. 2 the playback apparatuses as shown with numbers 0 to 8 assigned respectively thereto.

Furthermore, each node is assigned a node ID. Node IDs are a concatenation of path numbers from the root to the particular node. Path numbers 00, 01, and 10 are assigned to the paths in the stated order from left to right. For example, the node ID of the leaf to which the playback apparatus 6 is assigned is "1000".

The following briefly describes how device keys are assigned in the copyright protection system.

<Root>

A plurality of device keys are assigned to the root. In FIG. 2, these device keys are expressed as identification information Ka-0000, Ka-0001, Ka-0010, Ka-0011, Ka-0100, Ka-0101, and Ka-0110. In the identification information "Ka-" indicates that the device key is assigned to the root. The four bits after the "Ka-" are an NRP (node revocation pattern), and the highest bit of the NRP identifies whether the node is a parent node in relation to the leaf. The highest bit is "1" when the node is a parent node, and "0" in the case of any other node.

The three lower bits in the NRP express revocation information. The revocation information indicates, for each of the child nodes of the root, whether a device key or keys to be revoked exist in the device keys assigned to the child node. Here, "1" expresses a child node having a device key or keys to be revoked, and "0" indicates a child node not having a device key or keys to be revoked. The revocation information consists of information for each child node, concatenated in order from left to right of the tree structure.

Here, "revoke" means invalidating a playback apparatus and device keys for a reason such as the playback apparatus being analyzed and the device keys being exposed. Nodes corresponding to device keys revoked in this way are revoked. Such a node is called a revoked node.

Ka-0000 is a key held by all playback apparatuses belonging to the tree structure, and this is the device key that is used in an initial state in which none of the playback apparatuses in the tree structure has been revoked.

Other device keys are used to encrypt the media key when a revoked device key exists in the child nodes.

For example, when a revoked playback apparatus exists below the leftmost child node of the root, and no revoked playback apparatus exists below the other child nodes, the device key with the revocation information "100", identified by Ka-0100, is used. In this way, a device key is assigned to each corresponding revocation information, and, according to the position of the revoked playback apparatus in the tree structure, a selection is made of device keys identified by which pieces of revocation information are to be used subsequently.

Furthermore, no device keys having revocation information "111" are assigned. This is because the device keys assigned to the nodes of the lowest layer are used when all child nodes have a revoked playback apparatus.

<Nodes>

Six device keys Kb-1001, Kb-1010, Kb-1011, Kb-1100, Kb-1101, and Kb-1110 are assigned to the leftmost node in layer 1. Here, "Kb" indicates a device key assigned to the leftmost node of layer 1. In the same way as the device keys of the root, each device key is identified by revocation information about the child nodes. Furthermore, no device keys with revocation information "000" are assigned. This is because when no revoked playback apparatuses exist for nodes below a particular node, a device key assigned to the root which is the node above the particular node is used. Furthermore, no device keys having revocation information "111" are assigned. This is because when all playback apparatuses corresponding to the three leaves that are the child nodes are revoked, the device keys assigned to the node are not used.

Other nodes are each assigned six device keys identified by revocation information in the manner described.

<Leaves>

Each leaf has a playback apparatus assigned thereto. Here, the playback apparatuses are identified by numbers 0 to 8.

The leftmost leaf of layer 2 is assigned device keys Ka-0000, Ka-0001, Ka-0010, Ka-0011, Kb-1001, Kb-1010, and Kb-1011.

The leaf is assigned all device keys that are assigned to the nodes on the paths from the root to the leaf, excluding the device key corresponding to a revocation pattern for when the playback apparatus 0 is revoked. In other words, the device keys Ka-0100, Ka-0101, Ka-0110, Kb-1100, Kb-1101, and Kb-1110 are not assigned to the playback apparatus 0 since these are the device keys, among those assigned to the root and the leftmost node of layer 1, that are used when the playback apparatus 0 is revoked.

The other leaves are assigned device keys in the same manner.

(4) Device Key Selection Unit 102

The device key selection unit 102 selects device keys such that revoked playback apparatuses are unable to use the content, and outputs the selected device keys to the media key encryption unit 105.

In the initial state, the device key selection unit 102 selects Ka-0000, and outputs this selected device key to the media key encryption unit 105.

Figure 3:
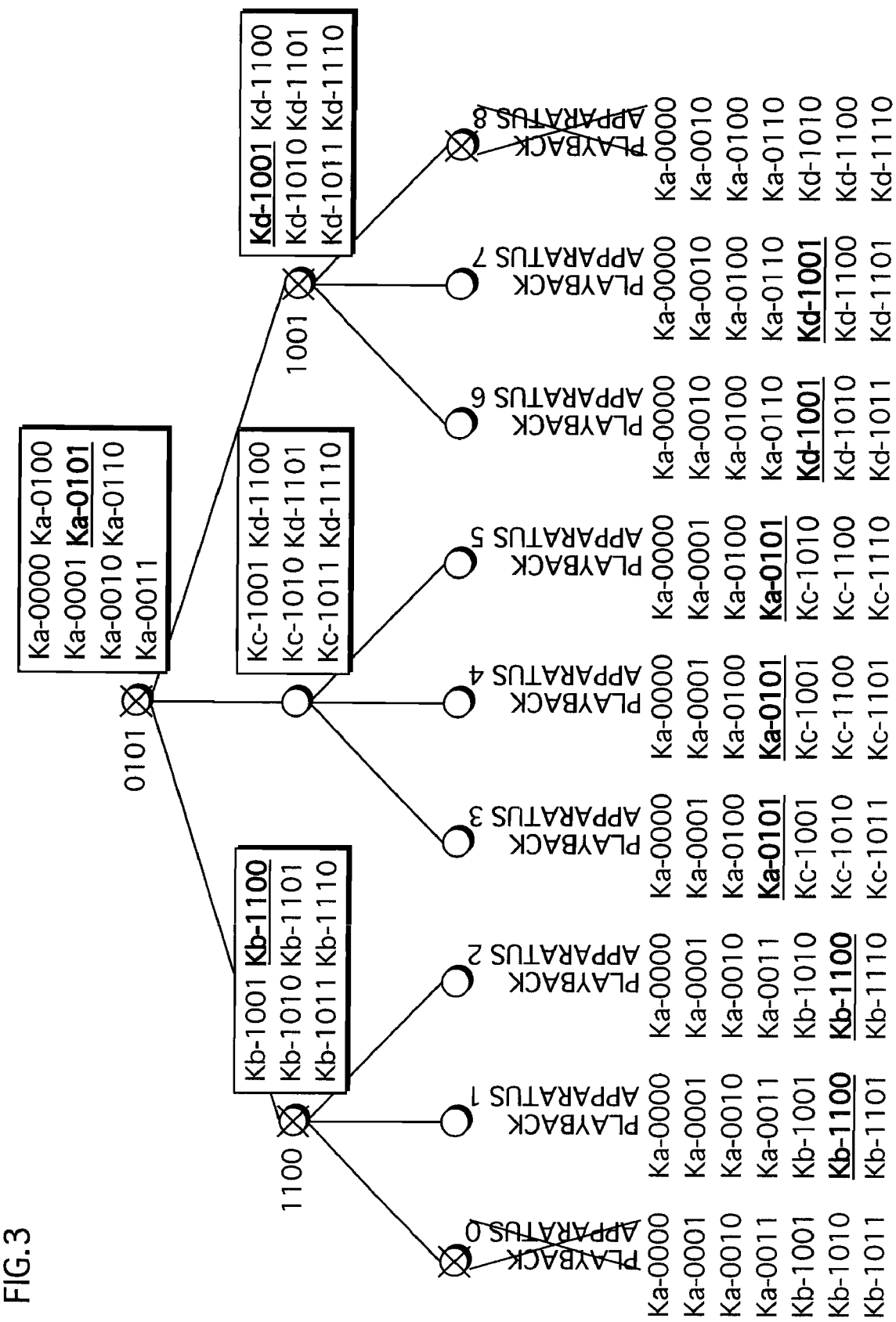
FIG. 3 shows the correlation between device keys in a case in which device keys to be revoked exist.

The method of selecting device keys when one or more revoked playback apparatuses exist is described with use of FIG. 3.

If the playback apparatuses 0 and 8 are revoked, all nodes on the paths from the root to each of the leaves corresponding to the playback apparatuses 0 and 8 are revoked. Each revoked node is indicated by a cross (X) in FIG. 3. When one or more playback devices are revoked, the device key that was being used is no longer able to be used. In other words, Ka-0000 that was being used in the initial state cannot be used.

Next, the device key selection unit 102 selects, for each revoked node, a device key that corresponds to the revocation pattern of the node. In the case of the root, the device key selection unit 102 selects the device key Ka-0101 whose revocation information is "101" since the left and right child nodes are revoked.

In the case of the leftmost node of layer 1, the device key selection unit 102 selects the device key Kb-1100 whose revocation information is "100", because the leftmost child node is revoked. The middle node in layer 1 has no revoked child nodes and therefore the device key assigned to the layer above, in this case Ka-0101 assigned to the root, is used. The device key selection unit 102 selects the device key Kd-1001 whose revocation information is "001" for the rightmost child node of layer 1, since the rightmost child node thereof is revoked.

(5) Conversion Information Generation Unit 104

The conversion information generation unit 104 generates conversion information for each of the device keys selected by the device key selection unit 102.

The NRP information is generated by concatenating the NRPs from the root through to the node to which the selected device key is assigned.

As shown in FIG. 3, when the playback apparatuses 0 and 8 are revoked, the conversion information generation unit 104 generates conversion information for the device keys Ka-0101, Kb-1100 and Kd-1001 selected by the device key selection unit 102.

First, the conversion information generation unit 104 generates conversion information for the device key Ka-0101 shared by the playback apparatuses 3 to 5. Here, since the only NRP for the nodes from the root through to the node to which the device key Ka-0101 is assigned is "101", the conversion information generation unit 104 outputs "101" to the conversion unit 103 as conversion information.

Next, the conversion information generation unit 104 generates conversion information for the device key Kb-1100 shared by the playback apparatuses 1 and 2. Since the NRPs for the nodes from the root through to the node to which the device key Kb-1100 is allocated are "101" and "100", the conversion information generation unit 104 concatenates these NRPs to generate conversion information "101100", and outputs the generated conversion information to the conversion unit 103.

Next, the conversion information generation unit 104 generates conversion information for the device key Kd-1001 that is shared by the playback apparatuses 6 and 7. Since the NRPs for the nodes from the root through to the node to which the device key Kb-1001 is allocated are "101" and "001", the conversion information generation unit 104 concatenates these NRPs to generate conversion information "101001", and outputs the generated conversion information to the conversion unit 103.

Furthermore, the conversion information generation unit 104 has the NRPs used to generate the conversion information written to the conversion information recording area 301 of the DVD 300, via the drive unit 110. Here, the NRPs are written in the order of height of the layers to which they are assigned.

Note that if header information attached to the encrypted media key or the encrypted content key is used as conversion information, it is unnecessary to record conversion information. Furthermore, it is unnecessary for conversion information to be recorded if the playback apparatus is has a structure enabling it to generate conversion information.

(6) Conversion Unit 103

The conversion unit 103 receives the media key from an external source via the input unit 108, and receives the conversion information from the conversion information generation unit 104. The conversion unit 103 applies respective XOR operations to the media key using each piece of conversion information, thereby converting the media key.

Figure 4A:
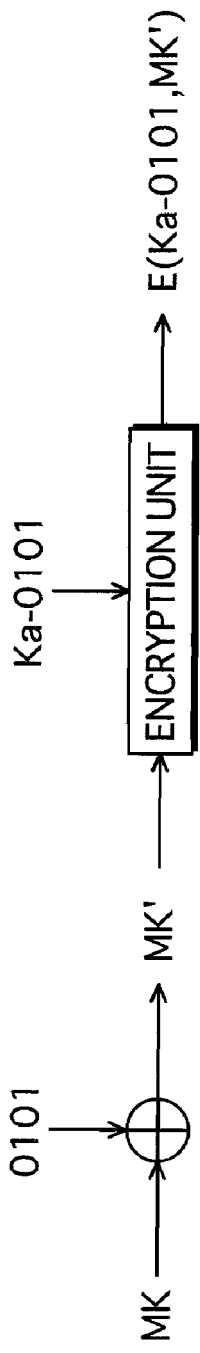
FIG. 4 shows the contents of media key conversion and encryption processing.
Figure 4B:
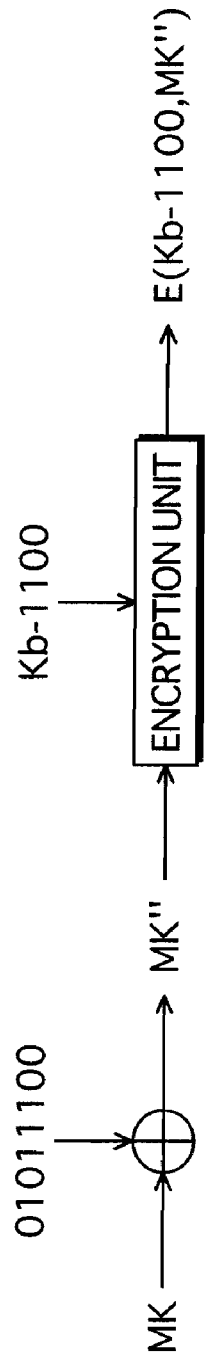

Specifically, as shown in FIG. 4A, the conversion unit 103 first converts the media key MK using the conversion information "0101" that corresponds to the device key Ka-0101, thereby generating a converted media key MK'. Next, as shown in FIG. 4B, the conversion unit 103 converts the media key MK using the conversion information "01011100" that corresponds to the device key Kb-1100, thereby generating a converted media key MK". Furthermore, the conversion unit 103 converts the media key MK using the conversion information "01011001" that corresponds to the device key Kd-1001, thereby generating a converted media key MK'''.

The conversion unit 103 outputs the generated converted media keys MK', MK", and MK''' to the media key encryption unit 105.

(7) Media Key Encryption Unit 105

The media key encryption unit 105 receives the device keys from the device key selection unit 102, and receives the converted media keys from the conversion unit 103. The media key encryption unit 105 encrypts each converted media key with the respective received device key.

Specifically, as shown in FIG. 4A, the media key encryption unit 105 first applies an encryption algorithm E1 to the converted media key MK' using the device key Ka-0101, thereby generating an encryption key E (Ka-0101, MK'). Here, the encryption algorithm E1 is, as on example, AES (advanced encryption standard). Since AES is commonly known, a description thereof is omitted. Note that E (X, Y) denotes a ciphertext obtained by encrypting data Y with key data X.

Figure 4C:
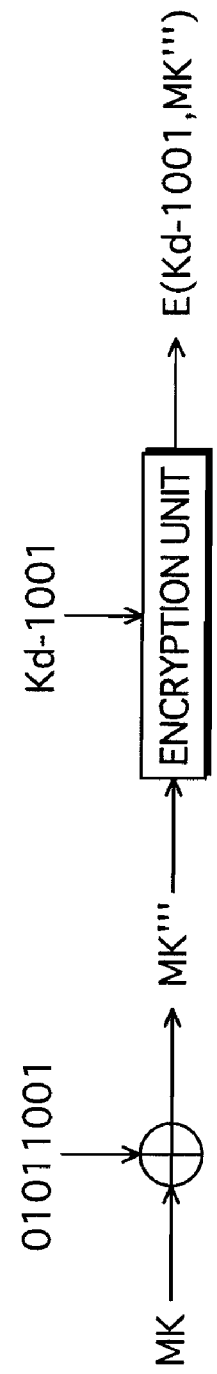

In the same way, as shown in FIG. 4B, the media key encryption unit 105 applies the encryption algorithm E1 to the converted media key MK" using the device key Kb-1100, thereby generating an encrypted media key E (Kb-1100, MK"). Next, as shown in FIG. 4C, the media key encryption unit 105 encrypts the converted media key MK''' using the device key Kd-1001, thereby generating an encrypted media key E(Kd-1001, MK''').

Furthermore, the media key encryption unit 105 writes the generated encrypted media keys E (Ka-0101, MK'), E (Kb-1100, MK"), and E (Kd-1001, MK''') via the drive unit 110 to the media key data recording area 302 of the DVD 300.

(8) Content Key Encryption Unit 106

The content key encryption unit 106 receives the content key CK and the media key MK via the input unit 108. The content key encryption unit 106 applies the encryption algorithm E1 to the content key CK using the received media key MK to encrypt content key CK, thereby generating an encrypted content key E (MK, CK). The content key encryption unit 106 then writes the generated encrypted content key E (MK, CK) via the drive unit 110 to the content key data recording area 303.

(9) Content Encryption Unit 107

The content key encryption unit 107 receives the content and the content key CK from an external source via input unit 108. The content key encryption unit 107 applies the encryption algorithm E1 to the content using the received content key CK to encrypt the content, thereby generating encrypted content E (CK, content). The content key encryption unit 107 writes the generated encrypted content E (CK, content) via the drive unit 110 to the content recording area 304 of the DVD 300.

1.2 DVD 300

Figure 5:
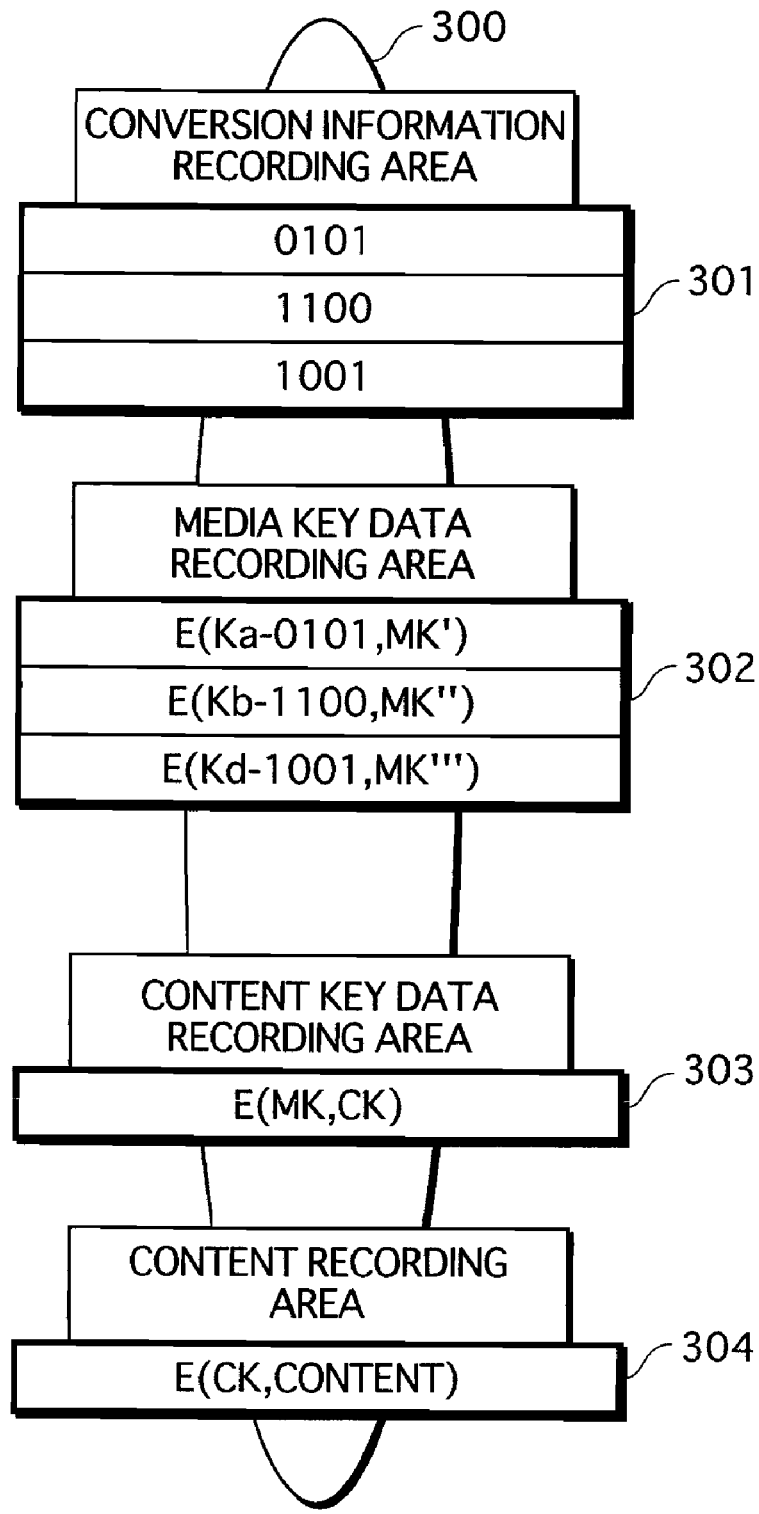
FIG. 5 shows the structure of recording areas of a DVD 300.

The DVD 300, as shown in FIG. 5, includes the conversion information recording area 301, the media key data recording area 302, the content key data recording area 303, and the content recording area 304.

The conversion information recording area 301 is an area to which the NRPs used to generate conversion information are written. The NRPs are written in the order of height of the layers to which they are assigned.

The media key data recording area 302 is an area for recording the encrypted media keys. The encrypted media keys are written in order from the encrypted media key encrypted using the device key assigned to the highest layer in the tree structure.

The content key data recording area 303 is an area for recording the encrypted content key.

The content recording area 304 is an area for recording the encrypted content.

1.3 Playback Apparatus 200

The playback apparatus 200 represents the structure common to the playback apparatuses 200a, 200b, etc., and corresponds to any of the playback apparatuses 0 to 8 in the tree structure.

The playback apparatus 200, as shown in FIG. 6, is composed of a device key selection unit 201, a device key storage unit 202, a media key decryption unit 203, a conversion unit 204, a content key decryption unit 205, a content decryption unit 206, a drive unit 207, a playback unit 208, a control unit 209, and an input unit 210. A monitor 220 and a speaker 221 are connected to the playback unit 209.

Similar to the key data generation unit 100, the playback apparatus 200 is, specifically, a computer system composed of a microprocessor, a ROM, a RAM, a hard disk unit, a display unit, and so on. The playback apparatus 200 achieves its functions by the microprocessor operating according to a computer program stored in the RAM or the hard disk.

(1) Drive Unit 207 and Input Unit 210

The input unit 210 receives input from an external source, and outputs the received input information to the control unit 209.

The drive unit 207 reads from the DVD 300, under the control of the control unit 209.

First, under the control of the control unit 209, the drive unit 207 reads the conversion information from the conversion information recording area 301, and outputs the read conversion information to the device key selection unit 201.

Next, the drive unit 207 reads the encrypted media keys from the media key data recording area 302, and outputs the read encrypted media keys to the media key decryption unit 203.

Furthermore, the drive unit 207 reads the encrypted content key E (MK, CK) from the content key recording area 303, and outputs the read encrypted content key E (MK, CK) to the content key decryption unit 205.

The drive unit 207 also reads the encrypted content E (CK, content) from the content recording area 304, and outputs the read encrypted content E (CK, content) to the content decryption unit 206.

(2) Playback Unit 208

Under the control of the control unit 209, the playback unit 208 generates a video signal and an audio signal from the content received from the content decryption unit 206, and outputs the generated video signal and audio signal to the monitor 220 and the speaker 221 respectively.

(3) Control Unit 209

On receiving instruction information instructing playback of content recording on the DVD 300 from the input unit 210, the control unit 209 controls the drive unit 207 to read various types of information from the DVD 300.

First, the control unit 209 controls the device key selection unit 201 to select a device key, specify a recording position of the encrypted media key, and generate conversion information.

Next, the control unit 209 controls the media key decryption unit 203 to decrypt the encrypted media key, thereby generating a converted media key, and has the conversion unit 204 re-convert the converted media key, thereby generating a media key.

Furthermore, the control unit 209 controls the content key decryption unit 205 to decrypt the read encrypted content key using the media key, thereby generating a content key. The control unit 209 has the content decryption unit 206 decrypt the read encrypted content using the generated content key, thereby generating content, and controls the playback unit 208 to have the content played back.

(4) Device Key Storage Unit 202

The device key storage unit 202 stores a plurality of device keys assigned to the playback apparatus 200 by an administrator. The assigned device keys are indicated in FIG. 2 by the identifiers shown below each of the playback apparatuses 0 to 8. For example, the playback apparatus 6 has device keys indicated by identification information Ka-0000, Ka-0010, Ka-0100, Ka-0110, Kd-1001, Kd-1010, and Kd-1011.

Furthermore, the device key storage unit 202 stores ID information indicating the position in the tree structure of the root to which the playback apparatus 200 is corresponded.

(5) Device Key Selection Unit 201

The device key selection unit 201 selects a device key, and outputs the selected device key to the media key decryption unit 203. An example of a method used to select a device key is one in which each device key is given an identifier in advance, the key data generation apparatus records the identifier of the device key to be selected on the DVD, and the playback apparatus selects the device key indicated by the identifier recorded on the DVD. This device key selection method is commonly known, and therefor a detailed description thereof is omitted.

The device key selection unit 201 specifies the recording position of the encrypted media key that corresponds to the selected device key, generates conversion information, and outputs the recording specification to the media key decryption unit 203 and the conversion information to the conversion unit 204. Note that processing for recording position designation and conversion information generation are described later.

(6) Media Key Decryption Unit 203

The media key decryption unit 203 receives the device key and the encrypted media key recording position from the device key selection unit 201, and reads the encrypted media key recorded in the area indicated by the received recording position from the DVD 300 via the drive unit 207.

The media key decryption unit 203 applies a decryption algorithm D1 to the encrypted media key using the device key, thereby generating a converted media key. Here, the decryption algorithm D1 performs the reverse processing of the encryption algorithm E1. The media key decryption unit 203 outputs the generated converted media key to the conversion unit 204.

Taking a specific example of the selected device key being Ka-0101, as shown in FIG. 7A, the media key decryption unit 203 decrypts the encrypted media key E (Ka-0101, MK') using the selected device key Ka-0101, thereby generating a converted media key MK'. In the case of the selected device key being Kb-1100, the media key decryption unit 203 decrypts the decrypted media key E(Kb-1100, MK"), thereby generating a converted media key MK", as shown in FIG. 7B. When the selected device key is Kd-1001, the media key decryption unit 203 decrypts the encrypted media key E (Kd-1001, MK'''), thereby generating a converted media key MK''', as shown in FIG. 7C.

The media key decryption unit 203 outputs the generated converted media key MK', MK" or MK''' to the conversion unit 204.

(7) Conversion Unit 204

The conversion unit 204 receives the converted media key from the media key decryption unit 203, and receives conversion information from the device key selection unit 201.

The conversion unit 204 performs an XOR operation on the received converted media key with the conversion information generated by the device key selection unit 201, thereby generating a media key.

Taking the specific example of the selected device key being Ka-0101, as shown in FIG. 7A, the conversion unit 204 converts the converted media key MK' using the conversion information "0101" that corresponds to the device key Ka-0101, thereby generating a media key MK. In the case of the selected device key being Kb-1100, the conversion unit 204 converts the converted media key MK" using the corresponding conversion information "01011100", thereby generating a media key MK, as shown in FIG. 7B. When the selected device key is Kd-1001, the conversion unit 204 converts the converted media key MK''' using the corresponding conversion information "01011001", thereby generating a media key MK, as shown in FIG. 7C.

The conversion unit 204 outputs the generated media key MK to the content key decryption unit 205.

(8) Content Key Decryption Unit 205

The content decryption unit 205 receives the encrypted content key from the drive unit 207, and the media key from the conversion unit 204. The content decryption unit 205 applies the decryption algorithm D1 to the encrypted content key using the received media key, thereby generating a content key, and outputs the generated content key to the content decryption unit 206.

(9) Content Decryption Unit 206

The content decryption unit 206 receives the encrypted content from the drive unit 207, and receives the content key from the content key decryption unit 205. The content decryption unit 206 applies the decryption algorithm D1 to the encrypted content using the received content key, thereby generating content, and outputs the generated content to the playback unit 208.

2. Operations in the Copyright Protection System 2.1 Operations by the Key Data Generation Apparatus 100

Figure 8:
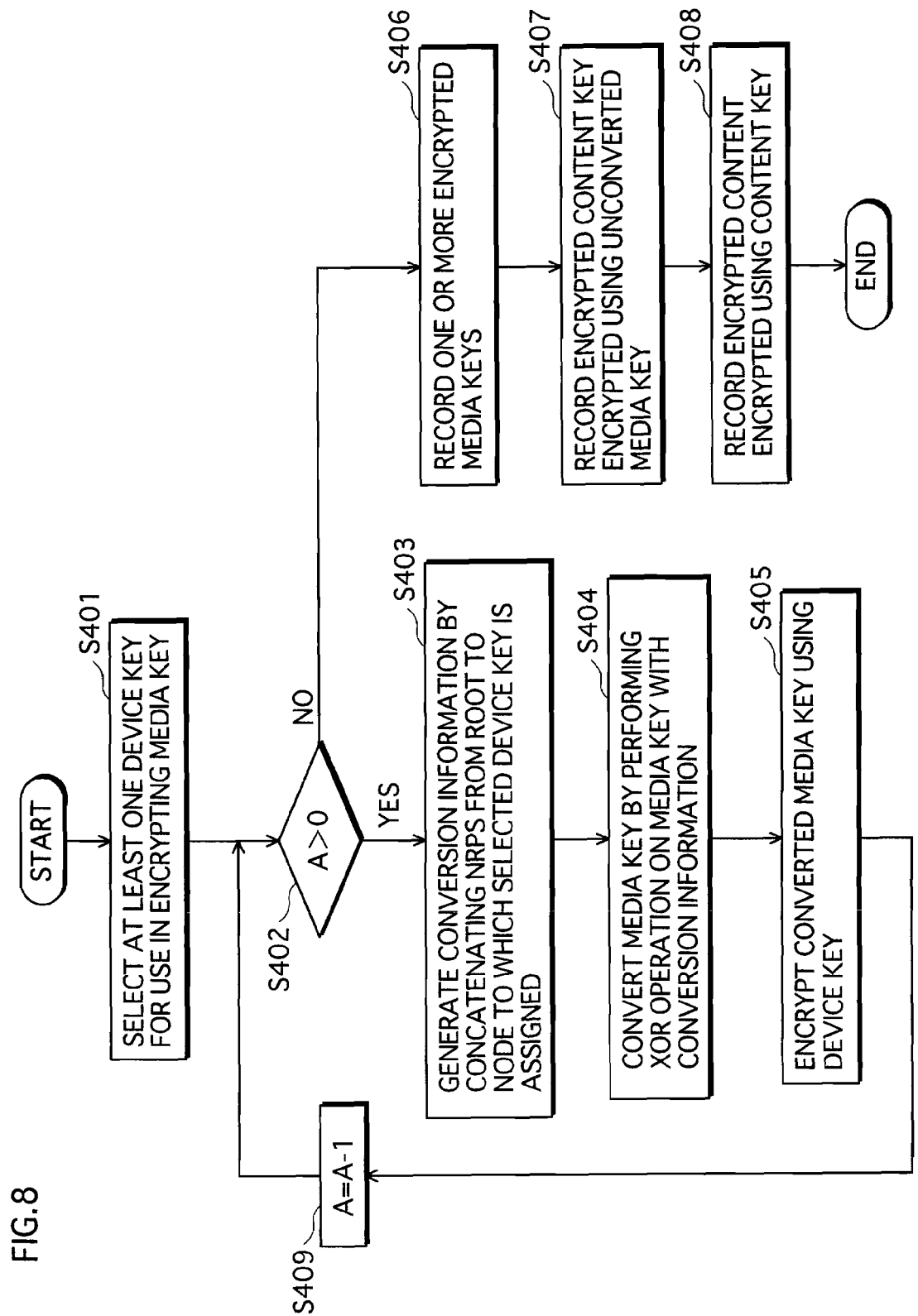
FIG. 8 is a flowchart showing key data generation processing in the key data generation apparatus 100.

The following describes the operations by the key data generation apparatus 100 with use of FIG. 8.

The device key selection unit 102 selects one or more device keys shared by the greatest number of playback apparatuses that have not been revoked (step S401), and outputs the selected device keys to the media key encryption unit 105 and the conversion information generation unit 104.

Next, the conversion information generation unit 104, the conversion unit 103, and the media key encryption unit 105 repeat the following processing for each of the selected device keys. Note that in FIG. 8, "A" indicates the number of selected device keys.

The conversion information generation unit 104 generates conversion information (step S403), and outputs the conversion information to the conversion unit 103. The conversion unit 103 converts the media key obtained via the input unit 108, thereby generating a converted media key (step S404), and outputs the generated converted media key to the media key encryption unit 105. The media key encryption unit 105 obtains the selected device key and the converted media key, and encrypts the converted media key using the obtained device key, thereby generating an encrypted media key (step S405).

When the processing at steps S403 to S405 has been performed for all the selected device keys, the generated conversion information and encrypted media keys are written to the DVD 300 via the drive unit 300 (step S406).

Next, the content key encryption unit 106 encrypts the content key using the unconverted media key (the media key before conversion), thereby generating an encrypted content key, and writes the generated encrypted content key to the DVD 300 via the drive unit 110 (step S407).

Furthermore, the content encryption unit 107 encrypts the content using the content key, thereby generating encrypted content, and writes the generated encrypted content to the DVD 300 via the drive unit 110 (step S408)

2.2 Operations by the Playback Apparatus

Figure 9:
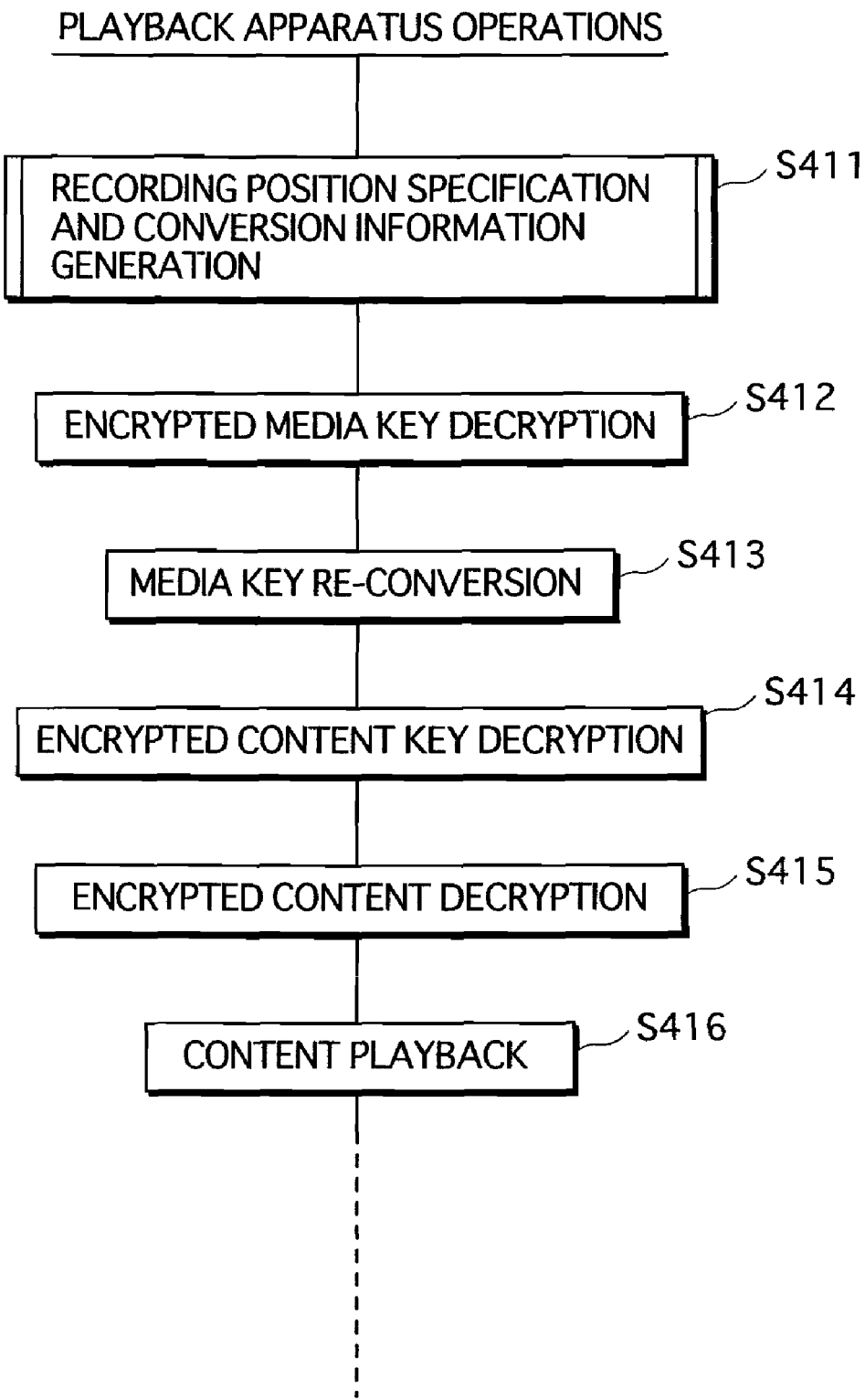
FIG. 9 is a flowchart showing operations by the playback apparatus 200.

The following describes, with use of FIG. 9, operations by the playback apparatus 200 for playing back content recorded on the DVD 300.

The device key selection unit 201 selects a device key based on conversion information read via the drive unit 207, and performs encrypted media key recording position specification and conversion information generation (step S411). The device key selection unit 201 outputs the selected device key and the recording position to the media key decryption unit 203, and outputs the conversion information to the conversion unit 204.

The media key decryption unit 203 reads the encrypted media key from the DVD 300 via the drive unit 207 according to the recording position, and decrypts the encrypted media key using the device key received from the device key selection unit 201, thereby obtaining a converted media key (step S412). The media key decryption unit 203 then outputs the converted media key to the conversion unit 204.

The conversion unit 204 applies an XOR operation to the converted media key using the conversion information received from the device key selection unit 201 (step S413), and outputs the resultant media key to the content decryption unit 205.

The content decryption unit 205 decrypts the encrypted content key read from the DVD 300 via the via the drive unit 207, using the media key, thereby obtaining a content key (step S414), and outputs the content key to the content decryption unit 206.

The content decryption unit 206 decrypts the encrypted content read from the DVD 300 via the drive unit 207, using the content key received from the content key decryption unit 205, thereby obtaining content (step S415), and outputs the content to the playback unit 208.

The playback unit 208 plays back the received content, and outputs it to the monitor 220 and the speaker 221 (step S416).

Figure 10:
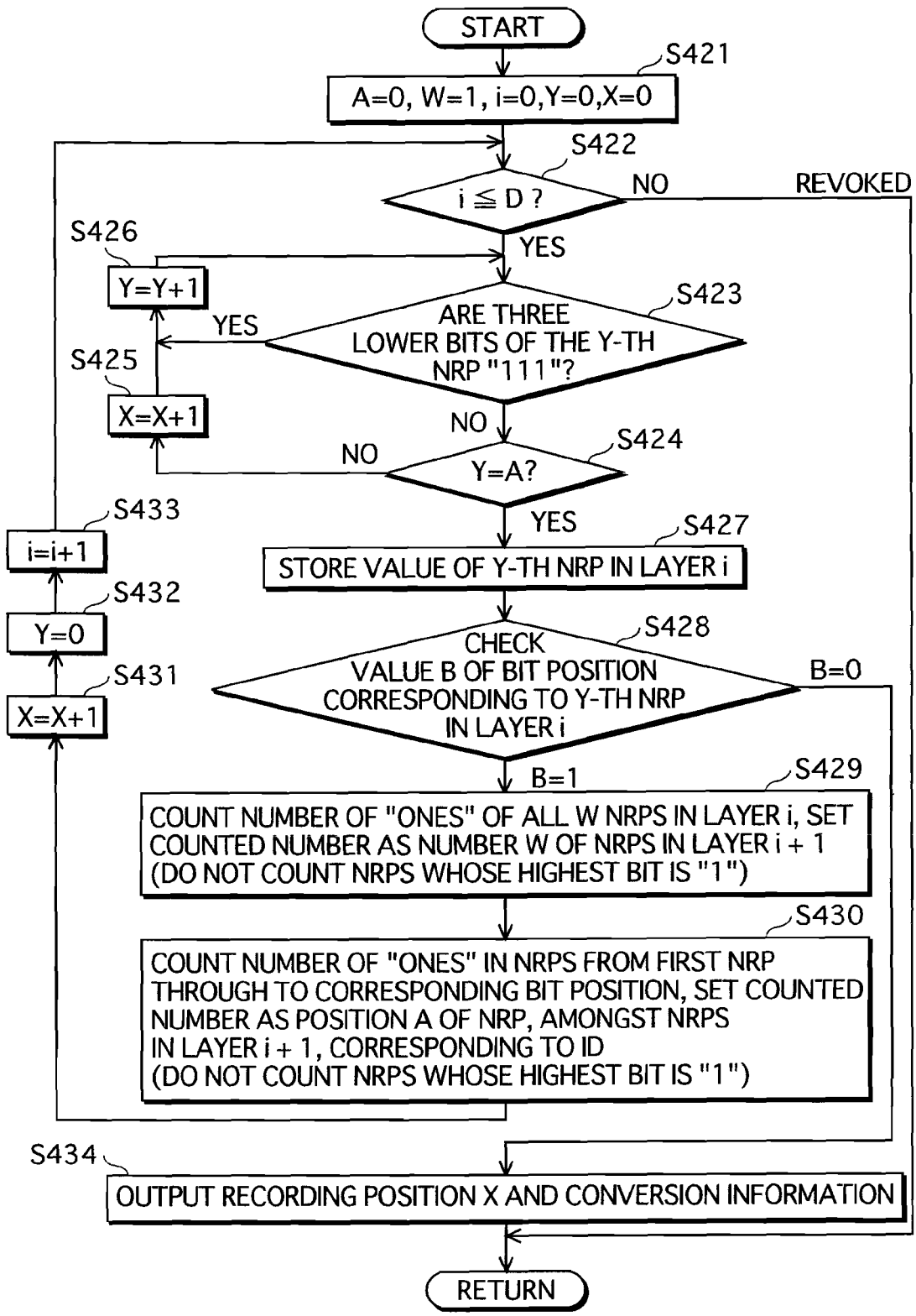
FIG. 10 is a flowchart showing recording position designation and conversion information generation operations in the playback apparatus 200.
Figure 12:
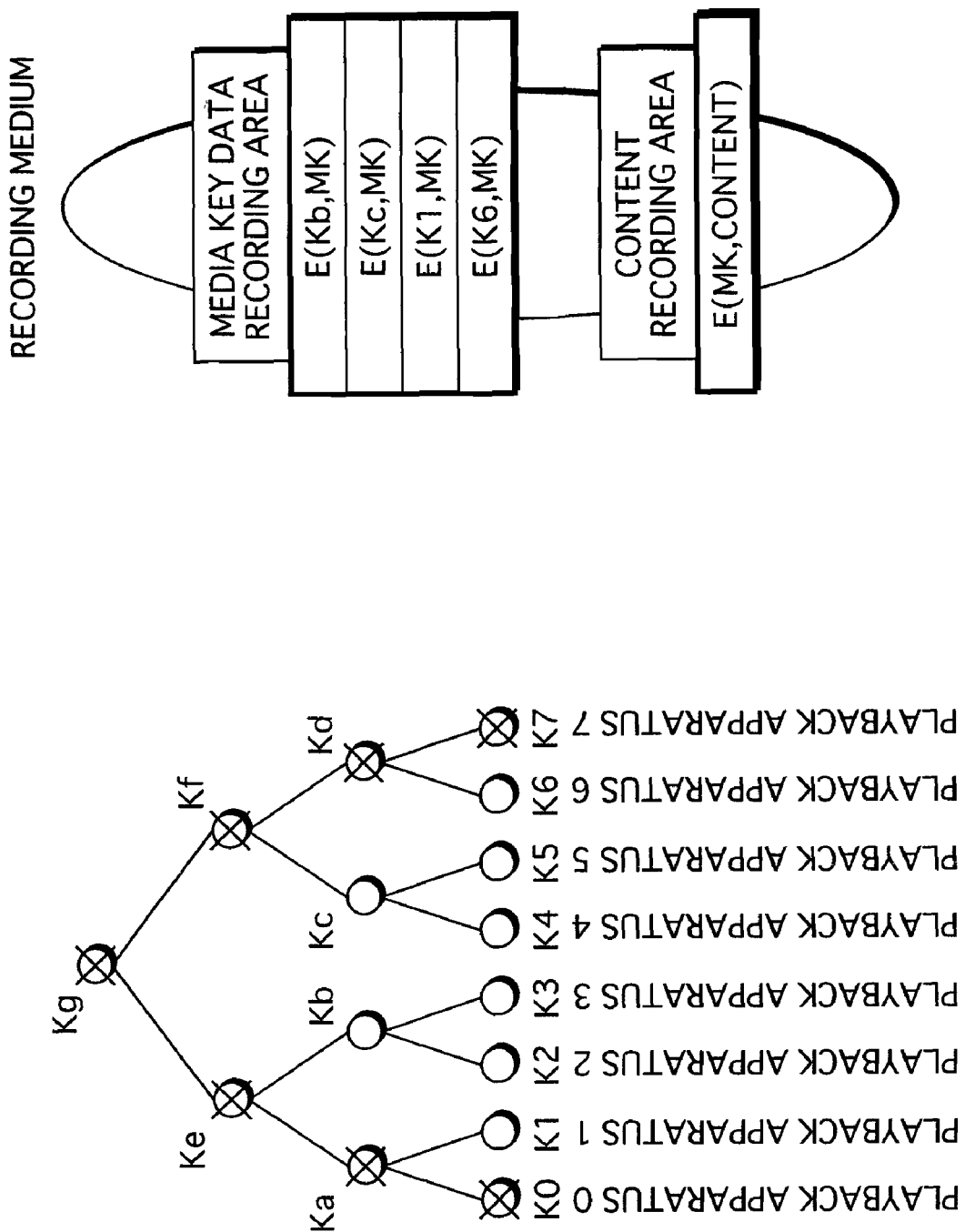
FIG. 12 shows an example of a key management method that uses a tree structure.

2.3 Encrypted Media Key Specification and Conversion Information Generation (1) The following describes the encrypted media key selection and conversion information generation at step S411, with use of FIG. 10.

The device key selection unit 201 checks, in order, the NRPs recorded in the conversion information recording area 301. The device key selection unit 201 has a variable Y indicating the position of the NRP being checked, a variable X indicating the recording position of the encrypted media key, a variable A indicating the position of the NRPs related to the playback apparatus 200, a variable W indicating the number of NRPs in a particular layer, and a value D indicating the number of layers in the tree structure. Note that the NRPs related to the playback apparatus 200 are the NRPs of the nodes on the route from the leaf to which the user apparatus is assigned through to the root in the tree structure.

The device key selection unit 201 performs analysis according to the following procedure, for layer i=0 through to layer i=D−1.

The device key selection unit 201 sets the following as initial values: variable A=0, variable W=1, variable i=0, variable Y=0, and X=0 (step S421).

The device key selection unit 201 compares the variable i and the value D, and when the variable i is greater than the value D (step S422), ends the processing because the playback apparatus 200 is revoked.

When the variable i is equal to or less than the variable D (step S422), the device key selection unit 201 judges whether the lowest three bits of the Y-th NRP recorded in the conversion information recording area 301 are "111" (step S423). When the three bits are "111", the device key selection unit 201 calculates Y=Y+1 (step S426), and returns to the processing at step S423.

When the three bits are not "111", the device key selection unit 201 judges whether or not the value of the variable Y and the value of the variable A are equal (step S424). When the values differ, the device key selection unit 201 calculates X=X+1 (step S425), calculates Y=Y+1 (step S426), and returns to the processing at step S423.

When the value of the variable Y and the value of the variable A are equal, the device key selection unit 201 stores the value of the Y-th NRP in layer i (step S427).

Next, the device key selection unit 201 checks whether, of the four bits that compose the Y-th NRP, the value B in the bit position corresponding to the value of the highest 2i-th bit and 2i−1-th bit is "0" or "1" (step S428). Here, the corresponding bit position is the leftmost bit of the Y-th NRP in the case of the value of the highest 2i-th bit and 2i−1-th bit being "00", the middle bit of the Y-th NRP in the case of "01", and the rightmost bit of the Y-th NRP in the case of "10". The ID information is composed based on the rule that, as shown in FIG. 2, in the tree structure left paths are assigned "00", middle paths are assigned "01", and right paths are assigned "10", and therefore shows the route from the root to the leaf corresponding to the playback apparatus.

When the value B is "1" (step S428), the device key selection unit 201 counts the number of "ones" in the W NRPs in layer i. However, the device key selection unit 201 does not count the "ones" in NRPs whose highest bit is "1". The device key selection unit 201 assigns the counted value to the variable W. The variable W obtained in this way indicates the number of NRPs on the next layer i+1 (step S429).

Next, the device key selection unit 201 counts the number of "ones" in the NRPs from the first NRP to the NRP in the corresponding bit position. However, the device key selection unit 201 does not count the "ones" in NRPs whose highest bit is "1". The device key selection unit 201 assigns the counted value to the variable A. Here, the device key selection unit 201 does not count the value of the corresponding bit position. The variable A obtained in this way indicates the position of the NRP related to the playback apparatus 200 (step S430).

Next, the device key selection unit 201 calculates X=X+1 (step S431), Y=0 (step S432), and i=i+1 (step S433), and returns to the processing at step S422.

When the value B=0 at step S428, the device key selection unit 201 outputs the value of the variable X to the media key decryption unit 203 as the recording position of the encrypted media key, outputs the generated conversion information to the conversion unit 204 (step S434), and ends the processing.

(2) The following describes specific processing for selection of an encrypted media key and generation of conversion information, using the case of the playback apparatus 6 in FIG. 2 as an example.

The playback apparatus 6 holds Ka-0000, Ka-0010, Ka-0100, Ka-0110, Kd-1010, Kd-1011 in advance as device keys, and "1000" as ID information.

a) The device key selection unit 201 judges whether or not the lowest three bits of the 0-th NRP "0101" recorded in the conversion information recording area 301 are "111" (step S423).

b) Since the lowest three bits are not "111", the device key selection unit 201 compares the values of the variable Y and the variable A (step S424), and because these values are equal, stores the value "0101" of the 0-th NRP in layer 0 (step S427).

c) Since the value of the top two bits of the ID information is "10", the device key selection unit 201 checks the rightmost bit of the lowest three bits of the 0-th NRP (step S428). Since the rightmost bit is "1", the device key selection unit 201 proceeds to the processing from step S429 onwards.

d) The device key selection unit 201 counts the number of "ones" in the lowest three bits of the one NRP "0101" on layer 0 (step S429). Since the counted value is "2", it is known that two NRPs exist on the next layer 1.

e) Next the device key selection unit 201 counts the number of "ones" in the lowest three bits of "0101" of the NRP up to the corresponding bit position. Note that the device key selection unit 201 does not count the value of the corresponding bit position. Since the counted value is "1", it is known that the position A of the corresponding NRP in the next layer 1 is position 1.

f) The device key selection unit 201 calculates X=X+1, Y=0, and i=i+1 (steps S431 to S433). As a result, the value of the variable X becomes "1".

g) The device key selection unit 201 judges whether or not the lowest three bits of the 0-th NRP "1100" on layer 1 recorded in the conversion information recording area 301 are "111" (step S423), and since the lowest three bits are not "111", compares the values of the variable Y and the variable A (step S424).

h) Since the values of the variables Y and A differ, the device key selection unit 201 calculates X=X+1 (step S425). As a result the value of X becomes "2". The device key selection unit 201 also calculates Y=Y+1 (step S426) As a result the value of Y becomes "1".

i) The device key selection unit 201 judges whether or not the lowest three bits of the first NRP "1001" on layer 1 are "111", and since the lowest three bits are not "111", compares the values of the variable Y and the variable A (step S424).

j) Since the values of the variables Y and A are equal, the device key selection unit 201 concatenates the NRP "1001" in position 1 on the layer 1 with the NRP "0101" stored the previous time, and stores the resulting concatenated value (step S427).

k) Since the value of the third and fourth top bits of the ID information is "00", the device key selection unit 201 checks the leftmost bit of the lowest three bits of the NRP in position 1 (step S428). The leftmost bit is "0", and therefore the analysis ends.

l) The device key selection unit 201 outputs the value "2" of the variable X to the media key decryption unit 203 as the recording position, and outputs "01011001" to the conversion unit 204 as conversion information (step S434).

The described processing results in the encrypted media key E (Kd-1001, MK) being specified from the recording position 2 of the playback apparatus 6, and conversion information "01011001" being generated.

3. Modifications

Although the present invention has been described based on a preferred embodiment, the present invention is not limited thereto. Cases such as the following are also included in the present invention.

(1) The encryption method used is not limited to being AES, and another encryption method may be used.

(2) Although the media key and content key are input from an external source in the preferred embodiment, they may instead be stored in the key data generation apparatus. Alternatively, a media key and a content key may be generated each time the key data generation apparatus is used.

(3) Two layers of encryption are used in the preferred embodiments, in other words, the contents are encrypted using the content and the content key is encrypted using the media key. However, it is possible to instead use one layer of encryption whereby the content is encrypted with the media key, or to provide an additional key or keys and increase the number of layers of encryption. If the number of layers of encryption is increased, it is sufficient for one of the keys that is encrypted to be converted.

(4) The conversion information is not limited to being the NRPs as described in the preferred embodiment. The conversion information may be any information generated to indicate the relationship in the tree structure between the position of a node to which a device key is assigned and other nodes, and to follow predetermined rules about path numbers, node position information, NRPs, and so on. Examples of the conversion information are described in (a) to (f) below.

(a) The conversion information generation unit 104 finds the node ID of the node to which the selected device key is assigned, and also finds the NRP. These are concatenated to generate conversion information. The following is a specific example.

In a case in which playback apparatuses 0, 1 and 8 are revoked as in FIG. 3, the device key selection unit 102 selects the device keys Ka-0101, Kb-1100, and Kd-1001.

The conversion information generation unit 104 first generates conversion information for the device key Ka-0101. Here, the node to which the device key Ka-0101 is assigned is the root, and since a node ID does not exist therefor, "0101", which is the NRP, is the conversion information.

Next, the conversion information generation unit 104 generates conversion information for the device key Kb-1100. Here, the node ID of the node to which the device key Kb-1100 is assigned is "00" and the NRP is "1100", and these are concatenated to generate conversion information "001100".

The conversion information generation unit 104 then generates conversion information for the device key Kd-1001. Here, the node ID of the node to which the device key Kd-1001 is assigned is "10" and the NRP is "1001", and these are concatenated to generate conversion information is "101001".

Furthermore, rather than concatenating the node ID with the NRP, the node ID only may be used as the conversion information. In such a case, since conversion information does not exist for the device key Ka-0101, the device key Ka-0101 may be encrypted without being converted, or converted using conversion information set in advance for the root. Here, the value used for this conversion information differs from other conversion information.

(b) Each node in the tree structure is given an identification number in order from top to bottom and left to right, starting from the root, as shown in FIG. 2, and the identification numbers are used as conversion information.

In other words, when playback apparatuses 0, 1 and 8 are revoked as shown in FIG. 3, the conversion information of Ka-0101 is "0", the conversion information of Kb-1100 is "01", and the conversion information of Kd-1001 is "11".

(c) Each layer in the tree structure is given a layer number as shown in FIG. 2, and the nodes in the same layer are given relative node numbers in order from left to right. Node position information is generated based on the layer number and the relative node number, and this generated position information is used as the conversion information.

(d) The NRPs of all nodes from the root through to the node to which the selected device key is assigned are retrieved in order from the highest layer through to the lowest layer, and from left to right within each layer, and concatenated to generate the conversion information. If necessary, this generated conversion information may be compressed and converted to a series of an arbitrary length, and this series used as the conversion information.

(e) The nodes are retrieved in order from the highest layer through to the lowest layer starting from the root, and the number of "ones" (or "zeros") are counted through to the node to which the device key is corresponded. The counted value is used as the conversion information.

Here, the counted value may be converted to binary, and the binary data concatenated with NRPs to generate the conversion information. The NRPs used here may be those from the root through to the node to which the device key is assigned, or may be all NRPS retrived based on the aforementioned rules. Alternatively, the binary data may be concatenated with only the one NRP that was retrieved last. A further alternative is to concatenate the binary data with an identifier of the device key used.

(f) All NRPs from the root through to the node to which the device key is corresponded are retrieved and converted to decimal numbers, and the total thereof used as the conversion information. Alternatively, the NRPs may be subject as binary to an XOR operation, and the result thereof used as the conversion information.

(5) In the preferred embodiment the highest bit of an NRP indicates whether a node is in a layer one higher than the leaf, however this bit may be used to convey other information. For example, the highest bit may be used to indicate whether or not any valid apparatuses exist in the descendants of the node. Alternatively, it is possible to use only the two or three lowest of the four bits of the NRP. Similarly, it is not necessary for the path number to be two bits. As with the NRPS, the path number may have other information attached thereto. Furthermore, it is possible to use either all or some bits of the path numbers.

(6) In the present invention, the described retrieval is not limited to being performed in order from highest layer to lowest layer and from left to right. Any method based on a predetermined rule is possible. For example, retrieval may be performed in a leftwards direction in the tree structure, or with precedence to depth.

(7) In the present invention, the operation to which the conversion information and media key are subject is not limited to an XOR operation described in the preferred embodiment. For example, any of the four fundamental operations of arithmetic may be used.

(8) In the case of a format that includes parity bits in the media key data, conversion information may be embedded in the parity bits of the media key, instead of subjecting the media key and the conversion information to an operation.

For example, when DES encryption is used, eight bits of the 64-bit media key data are parity bits, and the key data generation apparatus 100 converts the media key that has conversion information embedded in these eight bits.

It is not necessary for the playback apparatus 200 to generate conversion information. Instead, the playback apparatus 200 may read the encrypted media key from the DVD 300, delete the eight parity bits from the media key data, and use the 56 bits of valid key data as the media key.

Furthermore, the media key may be converted by embedding a different random number as parity bits each time the media key is encrypted with the device key. In this case also, the playback apparatus 200 deletes the parity bits without checking, and uses the 56 bits of valid key data as the media key.

(9) When parity bits are included as described in (5), conversion information or a random number may be embedded in some of the parity bits, and the remaining parity bits may be used for conveying information.

For example, if there are eight parity bits, a random number can be embedded in seven of the bits, and the remaining one bit used for conveying information. One example of how the bit may be used for conveying information is to use the bit as a flag indicating, for example, whether or not a list of identifiers of keys to be revoked exists on the recording medium on which the key data is recorded. Here, the bit used for conveying information is a fixed value for the particular recording medium, but since a random number is embedded as the remaining seven parity bits, the converted media key is different for each device key.

(10) In the preferred embodiment the key data generation apparatus 100 generates key data, encrypts the content, and writes the key data and encrypted content to the recording medium. However, it is not necessary for all these operations to be performed by the key data generation apparatus 100. In other words, it is possible to have different apparatuses that respectively generate key data, record key data, and record content.

Furthermore, the key data generation apparatus 100 may manage the device keys of the recording apparatus in addition to those of the playback apparatuses.

In this case, a recording apparatus holds the device keys assigned to the leaves of the tree structure. The key data generation apparatus 100 performs the processing described in the embodiment, generates conversion information and media key data, and records these to the DVD.

When encrypting the content key for encrypting the content, the recording apparatus performs the same processing as the playback apparatus 200, and selects and obtains an appropriate device key from among the held device keys. The recording apparatus encrypts the content key using obtained media key, and writes the encrypted content key and the encrypted content to the DVD.

Furthermore, the recording apparatus may use as the content key the key data recorded by the key generation apparatus 100.

(11) The key data is not limited to being recorded to a DVD. Any recording medium that is portable and mountable in both the key data generation apparatus 100 and the playback apparatus 200, such as a CD, MD, MO, or a BD (Blu-ray Disc), may be used. Furthermore, the key data and the content may be transmitted from the key data generation apparatus 100 to the playback apparatuses by communication over the Internet or the like.

(12) The present invention may be methods shown by the above. Furthermore, the methods may be a computer program realized by a computer, and may be a digital signal of the computer program.

Furthermore, the present invention may be a computer-readable recording medium such as a flexible disk, a hard disk, a CD-ROM (compact disk-read only memory), and MO (magneto-optical), a DVD-ROM (digital versatile disk-read only memory), a DVD-RAM (digital versatile disk-random access memory), a BD (BluRay Disc) or a semiconductor memory, that stores the computer program or the digital signal. Furthermore, the present invention may be the computer program or the digital signal recorded on any of the aforementioned recording medium apparatuses.

Furthermore, the present invention may be the computer program or the digital signal transmitted on a electric communication line, a wireless or wired communication line, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal to the recording medium apparatus, or by transferring the program or the digital signal via a network or the like, the program or the digital signal may be executed by another independent computer system.

(13) The present invention may be any combination of the above-described embodiment and modifications.

4. Conclusion

As has been described, the present invention is a content protection system in which content is usable only by a valid terminal apparatus, including: a key data generation apparatus that includes: a conversion unit operable to convert, based on a predetermined conversion rule, first key data for use in using the content, thereby generating second key data; an encryption unit operable to encrypt the second key data using a device key held by the valid terminal apparatus, thereby generating encrypted key data; and an output unit operable to output the encrypted key data, and a terminal apparatus that includes: an obtaining unit operable to obtain the encrypted key data; a decryption unit operable to decrypt the encrypted key data using a device key held by the terminal apparatus, thereby generating second key data; a conversion unit operable to convert, based on a predetermined conversion rule, the second key data, thereby obtaining first key data; an a content usage unit operable to use the content, based on the first key data.

Furthermore, the present invention is a key data generation apparatus that generates key data such that content can only be used by a valid terminal apparatus, including: a conversion unit operable to convert, based on a predetermined conversion rule, first key data for use in using the content, thereby generating second key data; an encryption unit operable to encrypt the second key data using a device key held by a valid terminal apparatus, thereby generating encrypted key data; and an output unit operable to output the encrypted key data.

Furthermore, the present invention is a terminal apparatus that uses content, including: an obtaining unit operable to obtain encrypted key data that has been generated by a key data generation apparatus converting first key data based on a predetermined conversion rule to generate second key data and encrypting the second key data using a device key, the first key data being for use in using content; a decryption unit operable to decrypt the encrypted key data using a device key held by the terminal apparatus, thereby obtaining second key data; a conversion unit operable to convert, based on a predetermined conversion rule, the second key data, thereby obtaining first key data; and a content usage unit operable to use the content, based on the first key data.

According to the stated structures, even if the device keys have identical values, the encrypted key data will not necessarily have identical values. Furthermore, it is not possible to determine whether or not the device keys have identical values using the encrypted key data. Therefore, illegal acquisition of the first key data can be prevented. Accordingly, revocation of playback devices that should not be revoked is prevented.

Here, in the key data generation apparatus, the conversion unit may generate the second key data by generating conversion information for the device key, and performing a reversible operation on the generated conversion information and the first key data, and the output unit may further output the conversion information.

Furthermore, the terminal apparatus may further include: a holding unit operable to hold a plurality of device keys; and a selection unit operable to select one of the device keys, wherein the obtaining unit obtains the encrypted data that has been generated by the key data generation apparatus obtaining the second key data by performing a reversible operation on the first key data and the conversion information generated for the device key, and encrypting the second key data, the decryption unit decrypts with use of the selected device key, and the conversion unit generates the first key information by generating conversion information for the selected device key, and applying a predetermined operation to the selected device key with use of the conversion information.

According to the stated structure, the key data generation apparatus applies a reversible operation to the first key data, using the conversion information generated for the selected device key, thereby generating the second key data. Only a terminal apparatus that holds the device key is able to re-convert the second key data in order to generate the first key data.

Here, the key data generation apparatus may further include: a key management unit operable to correspond device keys, which are held by terminal apparatuses, with nodes in a tree structure that defines relations between the device keys shared among the terminal apparatuses; and a selection unit operable to select, from among device keys held by valid terminal apparatuses, one or more device keys that are corresponded with a node in a highest position in the tree structure, wherein the conversion unit generates the conversion information based on positional information of each of the one or more selected device keys in the tree structure, and the encryption unit encrypts the second key data respectively with use of each of the one or more one selected device keys.

Furthermore, in the terminal apparatus, the conversion unit may generate the conversion information from header information appended to the encrypted key data.

Furthermore, in the terminal apparatus, the header information may be used for generating the conversion information, and may have been generated by the key data generation apparatus, which manages device keys using a tree structure, selecting, from among device keys held by valid terminal apparatuses, one or more device keys that are corresponded with a node in a highest position in the tree structure, and generating the header information based on positional information of each of the one or more selected device keys in the tree structure, the holding unit may hold positional information of the terminal apparatus, and the conversion unit may generate the conversion information with use of the header information and the held positional information.

According to the stated structure, the key data generation apparatus converts the first key data using conversion information generated based on the position of the selected device key in the tree structure. Therefore, even if device key shave identical values, a device key in a differing position in the tree structure cannot be used to re-convert the second key data correctly. Accordingly, illegal acquisition of the first key data can be prevented.

Here, the data generation apparatus may further including: a key management unit operable to correspond device keys, which are held by terminal apparatuses, with nodes in a tree structure that defines relations between the device keys shared among the terminal apparatuses and defines whether or not each of the device keys is revoked; and a selection unit operable to select, from among device keys held by valid terminal apparatuses, one or more device keys that are corresponded with a node in a highest position in the tree structure, wherein the conversion unit generates conversion information for each of the one or more selected device keys based on revocation information defined based on the node with which the selected device key is corresponded and a state of revocation of other nodes.

Furthermore, in the terminal apparatus, the header information may be for generating conversion information, and may have been generated by corresponding device keys, which are held by terminal apparatuses, with nodes in a tree structure that defines relations between the device keys shared among the terminal apparatuses and defines whether or not each of the device keys is revoked, selecting, from among device keys held by valid terminal apparatuses, at least one device key that is corresponded with a node in a highest position in the tree structure, and basing the header information on revocation information defined based on the node with which the selected device key is corresponded and a state of revocation of other nodes, the holding unit may hold positional information of the terminal apparatus in a tree structure for managing device keys of terminal apparatuses in the key data generation apparatus, and the conversion unit may generate the conversion information with use of the header information and the held positional information.

According to the stated structure, the conversion information is generated according to the positional relationship in the tree structure of the revoked device key, and therefore a device key having a different position in the tree structure cannot be used to re-convert the second key data correctly. Accordingly, illegal acquisition of the first key data can be prevented.

Here, in the key data generation apparatus the conversion unit may generates the conversion information for each of the one or more selected device keys by concatenating pieces of ID information, each of which identifies a path on a route from a root through to the node with which the selected device key is corresponded in the tree structure.

Furthermore, in key data generation apparatus the conversion unit may generates, as the conversion information for each of the one or more selected device keys, data that expresses a position of the node corresponded with the selected device key, the position being expressed in terms of a positional relationship between layers in the tree structure and between nodes in a same layer.

Furthermore, the conversion unit may generate the conversion information by concatenating pieces of revocation information, each of which relates to a node positioned on a route from a root through to the node with which the selected device key is corresponded.

Furthermore, in the key data generation apparatus the conversion unit may generate the conversion information by concatenating, from among revocation information corresponded to nodes arranged in a predetermined order, a first piece of revocation information through to a piece of revocation information of the node that corresponds to the selected device key.

According to the stated structure, since numerous patterns exist according to the position of the device key in the tree structure, a terminal apparatus that does not have the positional information of the valid device key in the tree structure is unable to generate conversion information, and is therefore unable to acquire the first key data.

Here, in the key data generation apparatus the conversion unit may generate the second key data by generating conversion information for the device key, and embedding the conversion information in at least part of a redundant portion of the first key data.

Furthermore, in the key data generation apparatus, the conversion unit generates the second key data by generating a random number for the device key, and embedding the generated random number in at least part of a redundant portion of the first key data.

Furthermore, in the terminal apparatus, the second key data may be generated by the key data generation apparatus by embedding conversion information generated for the device key in at least part of a redundant portion of the first key data, and the conversion unit may generate the first key data by deleting a redundant portion of the second key data.

According to the stated structure, when a redundant bit is included in the first key data, the redundant bit is embedded with conversion information or with a value that is different for each conversion, thereby making it difficult to find key data encrypted with a device key of an identical value. Therefore, only a terminal apparatus that is able to specify the correct position of the key data is able to acquire the first key data.

Here, in the key data generation apparatus the conversion unit may use a remaining part of the redundant portion in which the random number is not embedded for conveying other information.

According to the stated construction, a random number is embedded in some of the redundant bits, and the remaining redundant bits are used for conveying information. Therefore, the other information can be conveyed while illegal acquisition of the first key data can be prevented.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

INDUSTRIAL APPLICABILITY

The present invention can be used in a key management method that uses a tree structure, and is particularly suitable for preventing illegal acquisition of key data.

What is claimed is:

1. A key data generation apparatus that generates key data such that content can only be used by a valid terminal apparatus, comprising:
  a processor;
  a key management unit operable to correspond device keys, which are held by terminal apparatuses, with nodes in a tree structure that defines relations between the device keys shared among the terminal apparatuses and defines whether or not each of the device keys is revoked;
  a selection unit operable to select, from among device keys held by valid terminal apparatuses, one or more device keys that are corresponded with a node in a highest position in the tree structure;
  a conversion unit operable to cause the processor to (a) generate conversion information by concatenating pieces of revocation information, each of which relates to a node positioned on a route from a root through to the node with which the selected device key is corresponded, and (b) perform a reversible operation on the generated conversion information and first key data for use in using the content, thereby generating second key data;
  an encryption unit operable to encrypt the second key data using the selected device key, thereby generating encrypted key data; and
  an output unit operable to output the encrypted key data and the conversion information.

2. A key data generation apparatus that generates key data such that content can only be used by a valid terminal apparatus, comprising:
  a processor;
  a key management unit operable to correspond device keys, which are held by terminal apparatuses, with nodes in a tree structure that defines relations between the device keys shared among the terminal apparatuses and defines whether or not each of the device keys is revoked;
  a selection unit operable to select, from among device keys held by valid terminal apparatuses, one or more device keys that are corresponded with a node in a highest position in the tree structure;
  a conversion unit operable to cause the processor to (a) generate conversion information for each of the one or more selected device keys by concatenating, from among revocation information corresponded to nodes arranged in a predetermined order, a first piece of revocation information through to a piece of revocation information of the node that corresponds to the selected device key, and (b) perform a reversible operation on the generated conversion information and first key data for use in using the content, thereby generating second key data;
  an encryption unit operable to encrypt the second key data using the selected device key, thereby generating encrypted key data; and
  an output unit operable to output the encrypted key data and the conversion information.

3. A key data generation apparatus that generates key data such that content can only be used by a valid terminal apparatus, comprising:
  a processor;
  a key management unit operable to correspond device keys, which are held by terminal apparatuses, with nodes in a tree structure that defines relations between the device keys shared among the terminal apparatuses and defines whether or not each of the device keys is revoked;
  a selection unit operable to select, from among device keys held by valid terminal apparatuses, one or more device keys that are corresponded with a node in a highest position in the tree structure;
  a conversion unit operable to cause the processor to (a) generate second key data by generating a random number for the selected device key, and embedding the generated random number in at least part of a redundant portion of first key data for use in using the content;
an encryption unit operable to encrypt the second key data using the selected device key, thereby generating encrypted key data; and
an output unit operable to output the encrypted key data and the conversion information.

4. The key data generation apparatus of claim 3, wherein
the conversion unit uses a remaining part of the redundant portion in which the random number is not embedded for conveying other information.

* * * * *